(12) United States Patent
Lawrence

(10) Patent No.: US 10,853,808 B1
(45) Date of Patent: Dec. 1, 2020

(54) METHOD AND APPARATUS FOR CONTROLLED PRODUCTS

(71) Applicant: Mark Lawrence, Monrovia, CA (US)

(72) Inventor: Mark Lawrence, Monrovia, CA (US)

( * ) Notice: Subject to any disclaimer, the term of this patent is extended or adjusted under 35 U.S.C. 154(b) by 599 days.

(21) Appl. No.: 15/382,669

(22) Filed: Dec. 18, 2016

(51) Int. Cl.
*G06Q 20/40* (2012.01)
*G06Q 50/22* (2018.01)
*G06Q 10/08* (2012.01)
*G06Q 30/08* (2012.01)
*G06F 21/60* (2013.01)
*G06Q 20/38* (2012.01)

(52) U.S. Cl.
CPC ....... *G06Q 20/4014* (2013.01); *G06F 21/602* (2013.01); *G06Q 10/083* (2013.01); *G06Q 10/087* (2013.01); *G06Q 30/08* (2013.01); *G06Q 2220/00* (2013.01)

(58) Field of Classification Search
USPC .................................. 705/28, 44, 39; 726/7
See application file for complete search history.

(56) References Cited

U.S. PATENT DOCUMENTS

| | | | | |
|---|---|---|---|---|
| 5,031,218 | A * | 7/1991 | Galand | H04M 3/533 704/233 |
| 7,480,385 | B2 | 1/2009 | Weber | |
| 7,752,403 | B1 * | 7/2010 | Weinman, Jr. | G06F 21/6227 711/162 |
| 8,374,354 | B2 | 2/2013 | Berggren | |
| 2002/0198795 | A1 | 12/2002 | Dorenbosch | |
| 2012/0143624 | A1 | 6/2012 | Jena | |
| 2012/0310831 | A1 * | 12/2012 | Harris | G06Q 30/02 705/44 |
| 2016/0055322 | A1 * | 2/2016 | Thomas | H04L 63/0876 726/7 |

FOREIGN PATENT DOCUMENTS

WO    WO2008124049    10/2008

* cited by examiner

*Primary Examiner* — Dennis W Ruhl
*Assistant Examiner* — Reva R Moore

(57) ABSTRACT

The present invention is a method and apparatus for a first user to purchase a controlled product. The first user creates an order and specifies the set of conditions that the second user must meet to satisfy the order. The second user satisfies those conditions then can access an authorization from a third user prior to submitting a bid to supply the order. The first user can accept the bid then authorize payment. The first user and second user can confirm the product was delivered to the first user.

20 Claims, 16 Drawing Sheets

Data Storage System 207

- 601 CCS Database
- 602 Administration Database
- 603 Customer Database
- 604 Vendor Database
- 605 Authorization Database
- 606 Supplier Database
- 607 Order Database
- 608 Audit Database
- 609 Terms & Conditions Database
- 610 Product Database
- 611 Bid Database
- 612 Bulk Order Database
- 613 Transactions Database
- 614 Notification Database
- 615 Encryption Database
- 616 Workflow Management Database
- 617 Inventory Management Database
- 618 Payment Processor Database

Fig. 6

| 1101 | The vendor creates a workflow that is the preferred procedure to manage inventory. |

| 1102 | The vendor modifies the workflow that is the preferred procedure to manage inventory. |

| 1103 | The vendor saves the workflow that is the preferred procedure to manage inventory. |

| 1104 | The vendor activates the workflow that is the preferred procedure to manage inventory. |

END

| 1105 | The vendor logs into the workflow management system and starts the preferred procedure to manage inventory. |

| 1106 | The workflow management system opens the procedure to manage inventory. |

| 1107 | The workflow management system guides the user through the preferred procedure to manage inventory. |

| 1108 | The workflow management system saves the information created at each completed step in the process and also saves drafts for the incomplete steps. |

| 1109 | The workflow management system enables the user to resume the preferred procedure until the cycle is complete. |

END

Fig. 11

METHOD AND APPARATUS FOR CONTROLLED PRODUCTS

CROSS REFERENCE TO RELATED APPLICATION

This application claims the benefit of provisional patent application Ser. No. 62/274,298 filed 2016 Jan. 3 by the present inventor.

FEDERALLY SPONSORED RESEARCH

None.

SEQUENCE LISTING

None.

BACKGROUND OF THE PRESENT INVENTION

1.1) Field of the Invention

This invention relates generally to the field of making a market for controlled products.

1.2) Background

According to Business Insider, marijuana has many medical benefits (23 Health Benefits of marijuana). These benefits include treatment for glaucoma, improved lung health, better control of epileptic seizures, slowing the spread of cancer, reduced anxiety, slowing Alzheimer's disease, pain reduction for multiple sclerosis, helps Hep C therapy, treats inflammatory diseases, relieves arthritis discomfort, improves symptoms of Lupus, soothes tremors from Parkinson's disease, and helps veterans suffering from PTSD.

Under the Controlled Substances Act of 1970, marijuana was classified as a Schedule I drug because it was considered to have no "accepted medical use in treatment in the United States" (Eddy, 2010). Since then, 23 states and the District of Columbia have legalized the use of medical marijuana and more than a dozen state legislatures have recently considered medical marijuana bills. In fact, four states have legalized marijuana, 16 states have decriminalized marijuana and 23 states have legalized medical marijuana.

Despite the trend toward legalization, marijuana-related businesses face a number of legal challenges even in states like Colorado where marijuana has been legalized. Banks are reluctant to provide accounts for marijuana-related businesses because banks are regulated by the federal government who considers marijuana growers, who are not properly registered, to be conducting an illegal business. For example, many dispensaries cannot deposit marijuana proceeds legally without the bank being implicated in participating in an illegal activity which puts the bank at risk for asset seizure. In addition, The IRS has ruled that marijuana-related businesses cannot deduct regular business expenses. Further, under IRS code any activity that is considered illegal by the federal government is taxed at a significantly higher rate. However, the DEA will issue permits to people, institutions, and organizations to conduct business with marijuana. With this DEA permit, a marijuana-related business can get funding, make legal bank deposits, and file taxes with the usual deductions allowed.

Today, many dispensaries are therefore forced to conduct business in cash. This creates a substantial crime risk. In addition, customers prefer anonymity but in many cases they require authorization, such as a prescription, to consummate a transaction. These are significant challenges that impede the ability of marijuana-related businesses to conduct business efficiently.

However, these challenges create a number of opportunities to automate many of the tasks that are required to consummate transactions between customers and vendors, such as dispensaries, and also to automate many of the tasks that are required to consummate transactions between vendors and suppliers, such as growers. It also creates an opportunity to provide anonymity for participants who prefer it and authentication for transactions that demand it.

These and other challenges in controlled medical products markets are not resolved by the prior art. WO2008124049 A1 teaches a CRM system with quick notes. US 20120143624 A1 teaches a ERP system that centralizes medical information from various sources. U.S. Pat. No. 7,480,385 B2 teaches an encryption system for encrypting digital media content that is transmitted from a content distribution network to a consumer device. US 20020198795 A1 teaches an inventory management system for maintaining an inventory of items in a facility.

However, none of these disclosures, or any other prior art, teaches a market where customers, vendors, authenticators and suppliers can conduct transactions as peers in an anonymous fashion when required, where the platform cannot decrypt a customer's information, where customers can specify conditions that a vendor must meet to earn their business, where vendors can authenticate customers when required using a distributed trust authority, where vendors can reduce their cash exposure, where vendors can aggregate demand to place larger orders required for suppliers to achieve their minimum efficient scale, and where suppliers get better trend information to guide their production decisions.

Accordingly, there is a need for a market where customers, vendors, authenticators and suppliers can conduct cashless transactions in a manner that is anonymous to the platform but supports peer-to-peer authentication via a distributed trust authority. Also, where customers can specify conditions of purchase and vendors can aggregate demand to achieve the minimum efficient scale of suppliers. The applicant is not aware of any other commercially viable system that addresses the shortcomings of the prior art and also includes the features stated above. It is therefore an object of the present invention to set forth a system that offers these capabilities.

More specifically, it is an object of the present invention to enable users to create a profile and create symmetric encryption keys, public encryption keys and private encryption keys.

It is another object of the present invention to enable an authority, such as a doctor, to authorize an order for example by entering and encrypting information about a prescription if required.

It is a further object of the present invention to enable the customer to create and encrypt an order in a way that only users specified by the customer can decrypt the order and only vendors selected by the customer can decrypt the authentication.

It is another object of the present invention to enable the customer to specify the terms to decrypt the order and authentication.

It is yet another object of the present invention to enable the customer to validate their payment method for the order.

It is an object of the present invention to prevent the marketplace or authentication system from being able to decrypt the order or the authentication.

It is another object of the present invention to enable the customer to add meta data to an order and specify which meta data is encrypted and which is transferred in the clear.

It is a further object of the present invention to enable the vendor to see the clear meta data and decrypt the order after that vendor meets the terms and conditions specified by the customer.

It is another object of the present invention to enable the customer to make electronic payments to the vendor and for the vendor to make electronic payments to the supplier.

It is yet another object of the present invention to enable the vendor to request and receive authorization from the authentication authority for the customer's order when required.

It is an object of the present invention to enable the authentication authority to validate the authorization.

It is yet another object of the present invention to enable the vendor to bid for an order and for the customer to accept the bid.

It is an object of the present invention to enable the customer to authorize a payment and for the vendor to confirm delivery of the product.

It is another object of the present invention to enable the vendor to forecast, aggregate and publicize demand then solicit bids from suppliers.

It is yet another object of the present invention to enable the vendor to select a winning bidder, schedule payment and for the supplier to confirm fulfillment of the demand.

These and other objects of the present invention will be apparent to those skilled in the art from the following detailed description of the present invention, the accompanying drawings and the appended claims.

SUMMARY OF THE PRESENT INVENTION

In a preferred embodiment, the present invention provides a method and apparatus for:

Users to sign-up and create a profile that includes a dedicated symmetric encryption key, a dedicated private encryption key and a dedicated public encryption key.

Customers to create an order and transfer it in an encrypted form through the marketplace to selected vendors.

Authenticator to upload an authorization for an order, when required, and store it in an encrypted form in the marketplace.

Customers to specify the terms and conditions for a vendor to access the order.

Customers to validate their payment method.

Vendors to meet the conditions to decrypt the order.

Authenticator to validate the authentication.

Vendors to bid for the order and customer to accept bids.

Customers to authorize payments and vendors to confirm delivery.

Vendors to forecast, aggregate and publicize demand.

Supplier to bid for bulk product orders.

Vendor to select winning bidder and schedule payment.

Supplier to confirm order fulfillment.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 6 illustrates a first embodiment of the data storage system ("DSS" for the present invention.

FIG. 11 illustrates a first embodiment of the workflow procedure for the workflow management system ('WMS') of the present invention.

DETAILED DESCRIPTION OF THE INVENTION

With reference to the figures, exemplary diagrams of key components of the present invention are provided in which illustrative embodiments may be implemented. It should be appreciated that these figures are only exemplary and are not intended to assert or imply any limitation with regard to the components in which different embodiments may be implemented. Many modifications to the depicted components may be made.

System Overview

Figure 1:
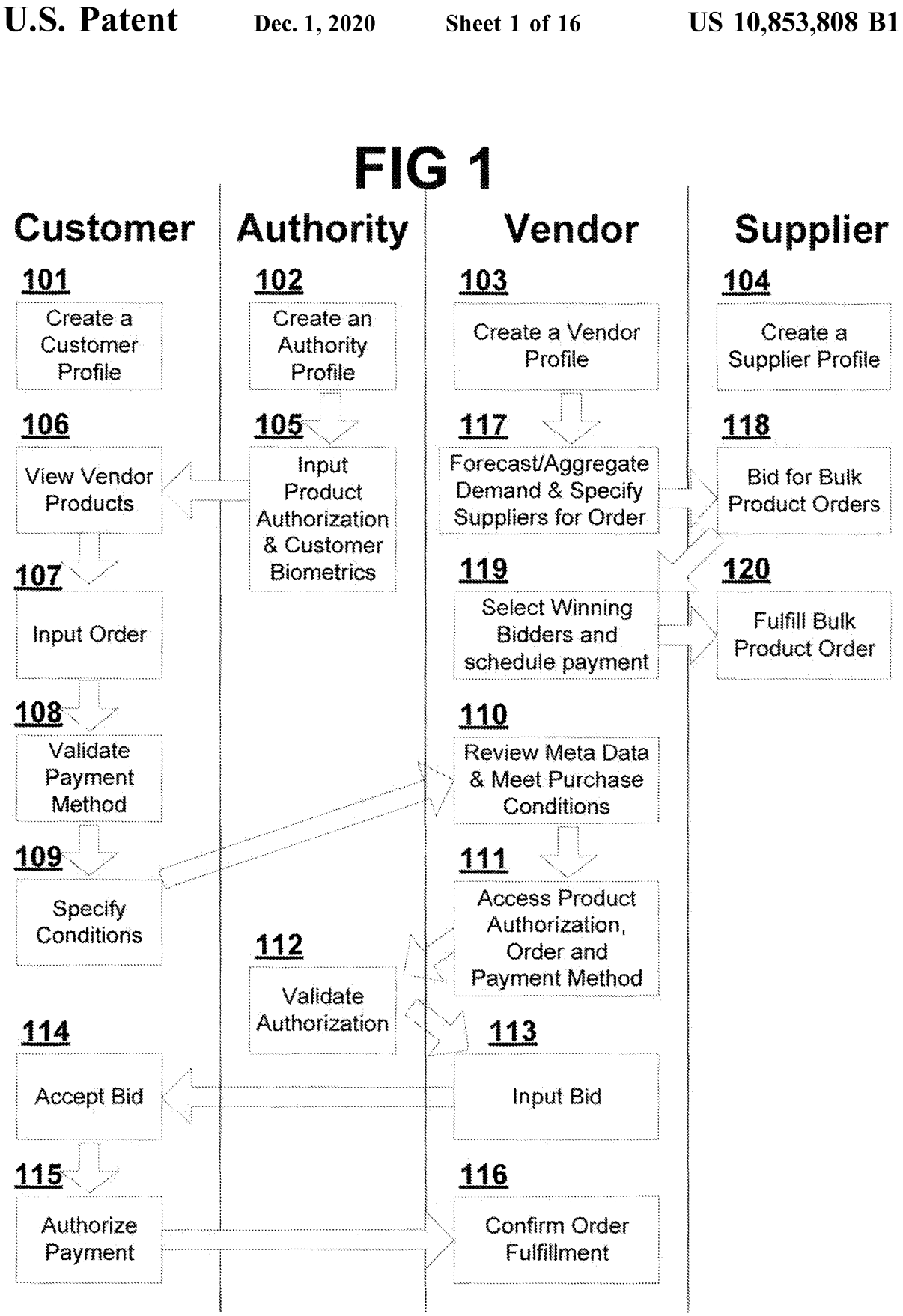
FIG. 1 illustrates a first embodiment of an overview of the present invention.

In an overview of the first embodiment illustrated in FIG. 1, the present invention provides a method and apparatus for customers to submit an encrypted order and specify a set of terms and conditions that the vendor must meet to decrypt the order. Only the vendors specified by the customer can decrypt the order. The vendor can authenticate the order prior to consummating the transaction. The vendor can replenish their inventory by soliciting bids from suppliers.

The present invention enables a customer 101, an authentication authority 102, a vendor 103 and a supplier 104 to create a profile. The present invention assigns to each of these users a symmetric encryption key, a public encryption key and a private encryption key which the users can request to be replaced at a later date if required. The present invention can also provide a new symmetric encryption key for each transaction.

The authentication authority inputs the product authorization. This may be information about a prescription that a doctor has written for the customer to purchase a controlled product 105. It can also include biometric information from the customer to support customer authentication.

The customer views product offerings from vendors 106. These product offerings have the vendor's public encryption key embedded. The customer then creates an order 107, for a controlled product, such as medical marijuana. The CCS encrypts the customer's order using the vendor's public encryption key. The CCS uses the vendor's private encryption key to decrypt the order. The order can also include meta data that is sent in the clear rather than being encrypted. The customer then validates his payment method 108 and specifies the conditions 109 that a vendor must meet to decrypt the order, such as limiting the use of the prescription for a duration of time or in a geographic location or on a specific device or for a number of purchases or only when a specific code is entered or only at a specific time of day or only if a predetermined biometric key is used. Some of these conditions may be specified by the authorization authority in the authorization, such as limiting the use of the prescription for a number of purchases.

The vendor reviews the clear meta data associated with the order and the conditions of purchase then the vendor meets those conditions of purchase 110. The vendor then accesses the authorization, sent by the customer, to purchase the product, decrypts the information using his private encryption key and views the order and views the payment method 111.

The authentication authority then validates the customer's authorization to buy the product 112. The vendor then inputs a bid to supply the order 113. The customer accepts the bid 114 and authorizes payment 115. The vendor then enters a confirmation of order fulfillment 116.

The CCS uses the vendor's public encryption key to encrypt the symmetric encryption key that in turn encrypts the information sent from the customer to the vendor. The CCS uses the vendor's private encryption key to decrypt the symmetric encryption key that is used to decrypt the information. The CCS uses the customer's public encryption key to encrypt the symmetric encryption key that in turn encrypts the information that is sent from the vendor to the customer. The CCS uses the customer's private encryption key to decrypt the symmetric encryption key that is used to decrypt the information sent from the vendor to the customer. The CCS uses a second symmetric encryption key to encrypt information transferred between the authentication system and the vendor.

The vendor also uses the present invention to forecast and aggregate demand then specify the suppliers who are allowed to bid for the bulk order 117. The forecast is based on sales and other trend information. The vendor aggregates demand from other vendors then submits a bulk order to suppliers. The supplier then submits a bid to supply the bulk product order 118. The vendor selects the winning bidder and schedules a payment 119. The supplier then fulfills the bulk product order 120.

System Context

Figure 2:
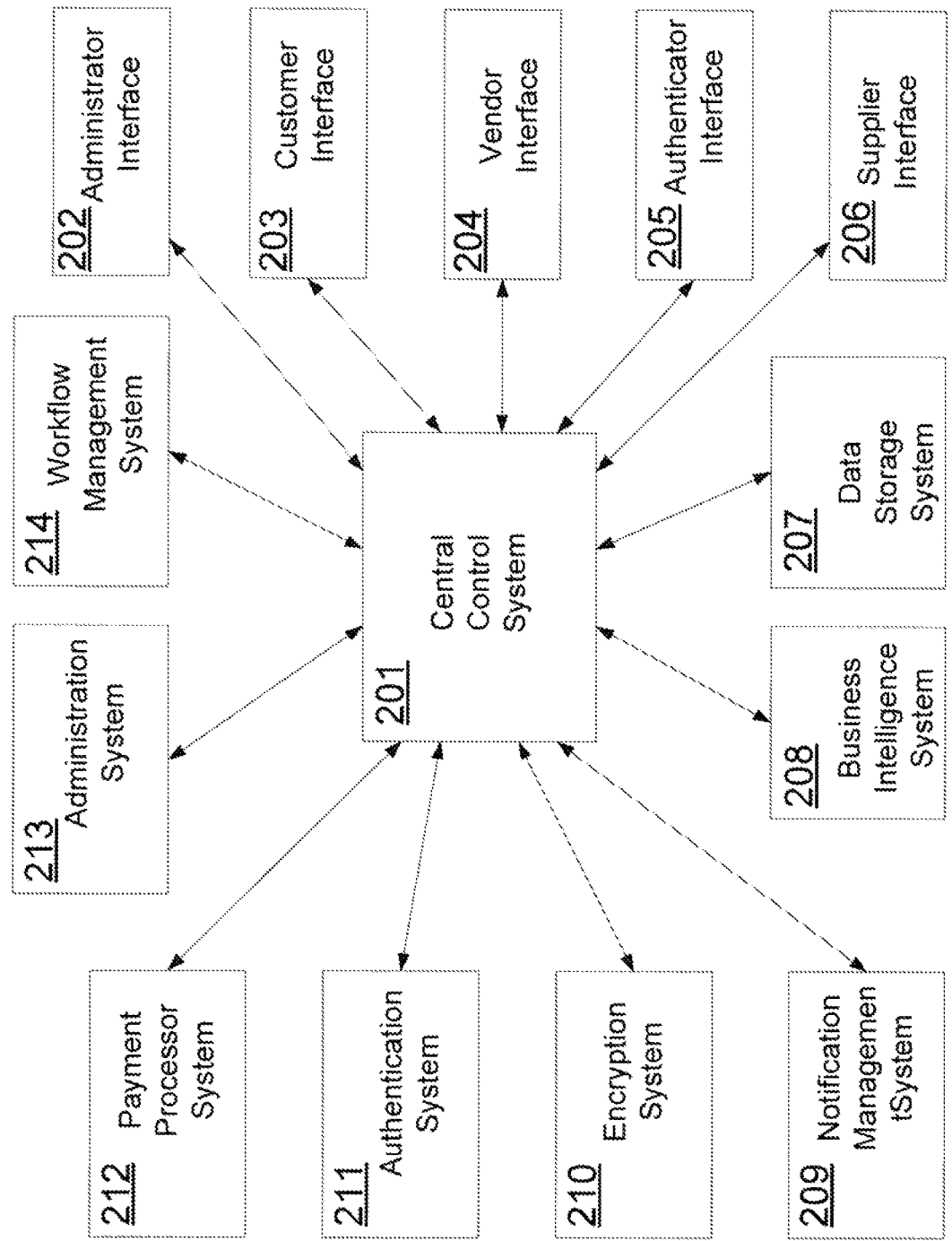
FIG. 2 illustrates a first embodiment of the system architecture of the present invention.

FIG. 2 illustrates the system context of a first embodiment of the apparatus and method of the present invention.

The central control system ("CCS") 201 is operatively coupled to a plurality of other systems and user interfaces. Operative coupling is the preferred procedure to exchange information between systems. In the present invention, the systems are inter-connected via a combination of wide area networks including the public switched telephone network, local area networks, such as an Ethernet network, token ring networks and wireless networks. Most systems, such as modern computers, include a built in interface to a local network, such as an Ethernet or 802.11b wireless network. The communications protocol used by these networks follow an international standard, such as 802.11b, that enables these systems to exchange data using a pre-determined method. However, local area network connectivity only ensures the integrity of data transfer. It is also necessary to specify the information to transfer, its source location and its intended location in the destination system. Each system has its key information stored in pre-determined locations in its database. When the installation engineers configure the interface between two systems they specify the pre-determined location of the required information in the source system's database and the pre-determined location for that information in the destination system's database. The engineers also specify the pre-determined frequency of information transfer (e.g., continuous, every day at 10:00 PM PT), the pre-determined format to use (e.g., synchronous, flat file Extract Transform Load "ETL") and the pre-determined error checking protocol to use. The combination of network connectivity and the configuration of the communication method by installation engineers enable systems to be operatively coupled to the CCS.

The user interfaces are operatively coupled to the CCS 201. The different types of users access the CCS through a plurality of user interfaces. The user interfaces include the system administrator interface 202, the customer interface 203, the vendor interface 204, the authenticator interface 205 and the supplier interface 206 (collectively "the user interfaces"). The user interfaces are the input and output gateways for communications with the CCS 201.

The data storage system 207 is operatively coupled to the CCS. The data storage system stores the plurality of data used by the present invention.

The business intelligence system 208 is operatively coupled to the CCS. The business intelligence system calculates and stores a plurality of information about trends, patterns and relationships in the databases used by the present invention.

The notification management system 209 is operatively coupled to the CCS. The CCS sends an alert to the notification management system whenever an event occurs that requires the attention of a user or other entity. For example, after an order has been received that meets a predetermined set of criteria then the CCS will instruct the notification management system to alert the relevant user by sending an email, text message or alternative notification.

The encryption system 210 is operatively coupled to the CCS. The encryption system enables a symmetric encryption key, public encryption key and private encryption key to be generated for each user or transaction. It also provides an algorithm that is used to encrypt and decrypt information. It supports a multitude of encryption techniques including symmetric encryption that uses the same key to encrypt and decrypt information as well as asymmetric encryption that uses a public encryption key to encrypt information and a private encryption key to decrypt the same information.

The authentication system 211 is operatively coupled to the CCS. The authentication system enables a user to authenticate whether the customer is permitted to purchase a controlled product. For example, a doctor can register information about a prescription with the authentication system. This enables the dispensary vendor to verify the legitimacy of a customer's order with the authentication system prior to completing the payment process. A vendor can also use the authentication system to authenticate a customer. For example, a customer's biometric information, such as a finger print, can be uploaded to the authentication system then the vendor can ask the customer for biometric authentication prior to fulfilling the order. In this case, the CCS will compare the customer's finger print that is captured at the point of sale with the registered finger print stored in the authentication system.

The payment processor system 212 is operatively coupled to the CCS. The payment processor system enables payments to be escrowed and transferred from the customer to the vendor with fees being transferred to the operator of the present invention and to any third party service providers. A number of service providers offer payment processor systems that can be used by the present invention, such as WePay and Stripe.

The administration system 213 is operatively coupled to the CCS. The administration system enables a user to administer the CCS. For example, the system administrator can use the administration system to update the look, feel and content of the web and mobile interfaces. The administration function also provides forum services that support community discussions and enables technical support and maintenance functions for the present invention.

The workflow management system 214 is operatively coupled to the CCS. The workflow management system enables the vendor to specify and execute the preferred procedure to complete specific business functions, such as inventory management. For example, a vendor can define a workflow that analyzes orders from customers then estimates and executes bulk orders from suppliers to optimize inventory.

Figure 3:
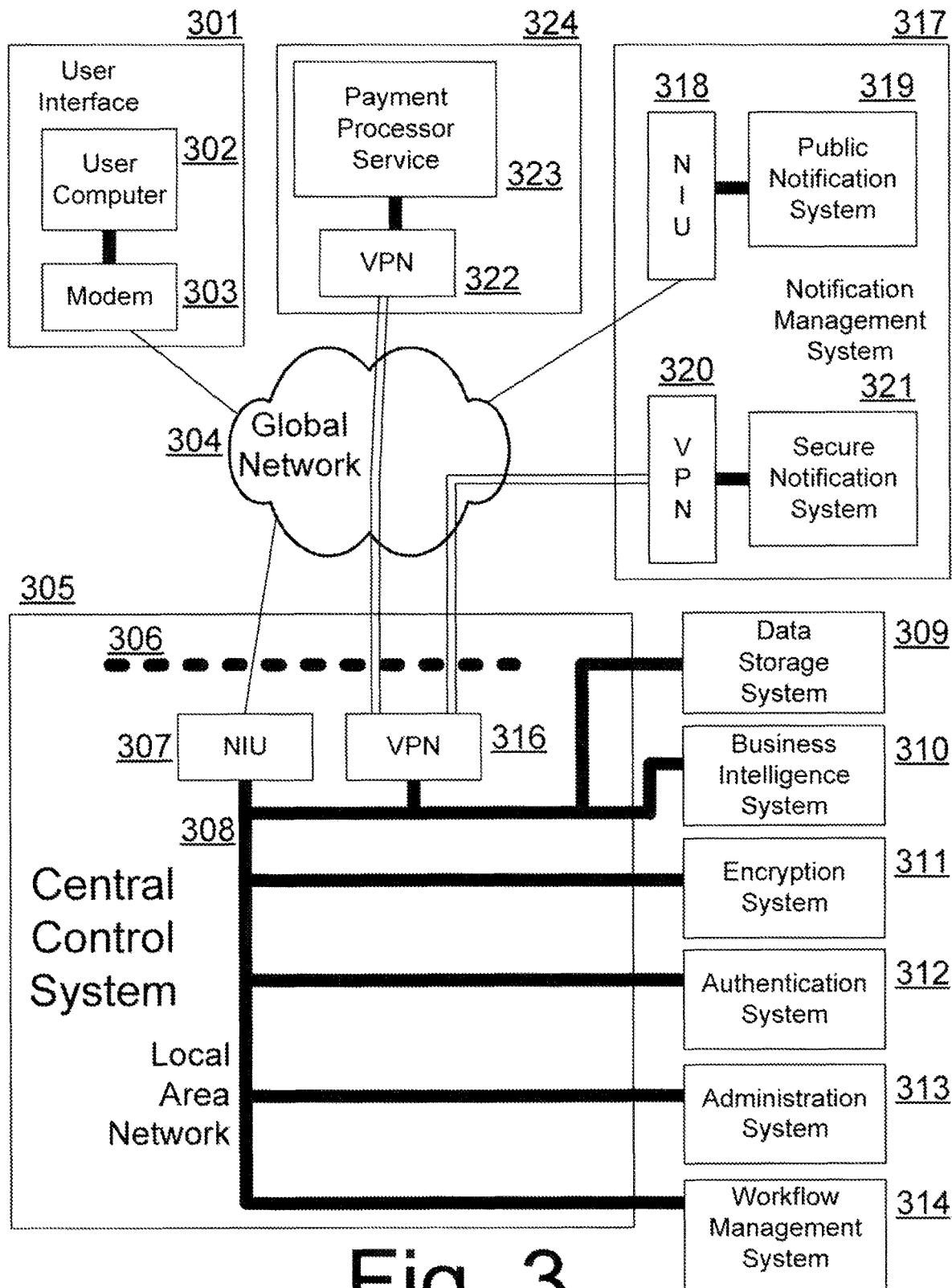
FIG. 3 illustrates a first embodiment of the integration among the central control system and key components of the present invention.

FIG. 3 illustrates the network connectivity of a first embodiment of the apparatus and method of the present invention.

The user interfaces 301 include a computer 302 and a modem 303. Many companies make mobile and desktop computers that a user can use to access the CCS including Apple, Samsung, Hewlett Packard, and Toshiba. In addition, many companies make modems that can connect to the CCS including 3Com Corp., D-Link Systems, Inc., and US Robotics. The user's computer is connected to the CCS via the modem and a Global Network 304, such as the Internet. The user's modem can be connected to the Global Network using at least one of a plurality of services including public or private networks such as the public switched telephone network, dedicated data line, cable service, cellular service, WiFi service, personal communication system ("PCS"), satellite network, and a microwave connection. These types of connections are provided by a plurality of organizations including local and regional telephone operating companies, cable TV companies and other providers of private and public networks.

The CCS 305 includes a local area network 308 that is connected to the global network 304 via a network interface unit ("NIU") 307 and a firewall 306. The CCS is also connected to other systems via the local area network 308 including the Data Storage System 309, Business Intelligence System 310, Encryption System 311, Authentication System 312, Administration System 313, and the Workflow Management System 314.

The CCS 305 also includes a Virtual Private Network ("VPN") modem 316 that is connected to the Secure Notification System 321 and the Payment Processor System 323.

Many companies make VPN modems that can be used with the present invention including Netgear, Linksys and Cisco. The Secure Notification System 321 is connected to the CCS via the Global Network using a Virtual Private Network modem 320. In addition to the Secure Notification System 321, the Notification Management System 317 includes a Public Notification System 319. The Public Notification System 319 is connected to the Global Network using a Network Interface Unit 318. The preferred embodiment of the present invention can use a plurality of Public Notification Systems including email services and mobile services. The present invention can operate with many such email services including Yahoo, Hotmail and Gmail. Many organizations provide such email services including Yahoo, Microsoft and Google. The Payment Processor System 324 includes a Payment Processor Service 323 that is connected to the Global Network via a VPN modem 322. Many organizations provide such Payment Processor Services that can be used with the present invention including Paypal, Western Union, WePay, Stripe and Verisign.

Figure 4:
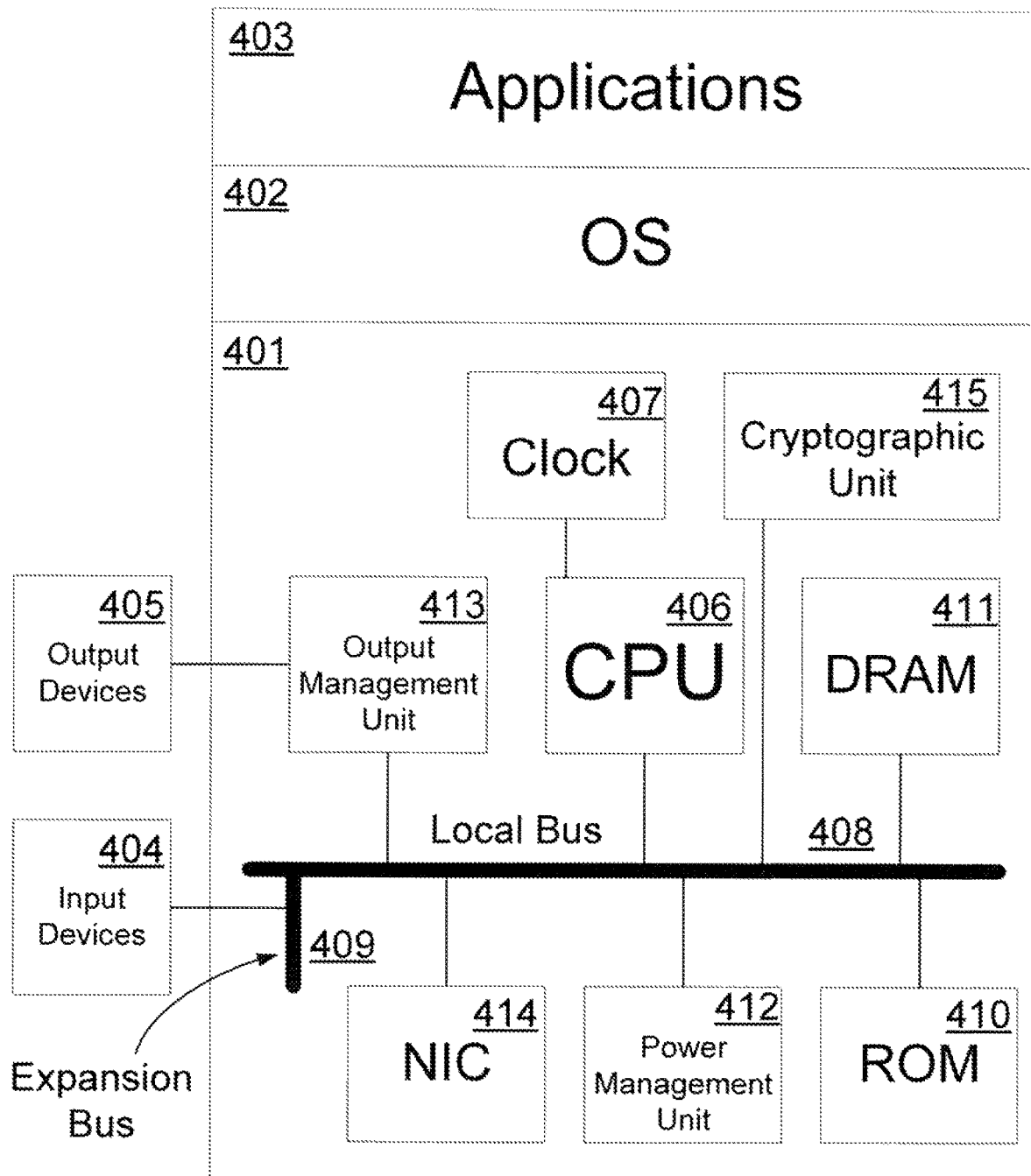
FIG. 4 illustrates a first embodiment of the technical platform for the central control system of the present invention.

FIG. 4 illustrates the key components of the CCS in a first embodiment of the apparatus and method of the present invention.

The Central Control System ("CCS") includes a number of key components including the main hardware 401, the operating system 402, software applications 403, input devices 404 and output devices 405. The operating system 402 is the interface between the applications and the hardware. It controls the execution of computer applications and provides services to those applications. The preferred embodiment of the present invention can use one of a plurality of standard commercial operating systems, such as Microsoft windows, Linux and UNIX. The applications 403 include software tools such as commercial anti virus software available from companies such as McAfee and Norton, and a browser, such as Microsoft Internet Explorer, Chrome and Firefox. The CCS also includes some unique code that implements some of its unique functions described in this disclosure, such as coordinating data interchange among the different systems illustrated in FIG. 2. This unique code can be programmed using one or more standard programming languages including java, javascript, PH P, HTML, C, C+, and visual basic. Input devices 404 include a plurality of commercial options such as a smartphone, keyboard, a camera, a mouse, and a microphone. Output devices 405 include a plurality of commercial options such as a smartphone, monitor and speakers. These standard commercial input devices 404 and output devices 405 are available from a plurality of vendors such as CompUSA and Office Depot.

The main hardware 401 in the CCS can be a conventional smartphone or personal computer or a conventional server with sufficient memory and processing power. To one skilled in the art, it will be evident that the functionality of the CCS can be distributed over multiple inter-connected smartphones, multiple inter-connected personal computers or multiple inter-connected servers. The main hardware includes a number of key components including the central processing unit ("CPU") 406, clock 407, local bus 408, expansion bus 409, read only memory ("ROM") 410, dynamic random access memory ("DRAM") 411, power management unit 412, output management unit 413, network interface card 414 and cryptographic unit 415.

The central processing unit ("CPU") 406 is the component of the CCS that performs most of the data processing. It interprets instructions, performs logical and arithmetic operations on data, and controls input and output functions. The preferred embodiment of the present invention can use a commercial CPU from a plurality of vendors, such as a Pentium G3258 supplied by Intel and the FX-9590 supplied by AMD. The clock 407 regulates the rate at which the CPU processes instructions. The CCS also uses the clock to synchronize the operation of its key components. A CPU such as a Pentium G3258 can operate at a clock speed of 3.2 GHz. The CCS uses the local bus 408 to inter-connect its key components. These key components exchange data via the local bus. The CCS uses the expansion bus 409 to enable expansion cards to exchange data with the CPU and memory. Examples of commercial expansion cards are sound cards and graphics cards. The expansion bus also enables input devices 404, such as a mouse, to input data that can be used by the key components of the CCS. The read only memory ("ROM") 410 includes the instructions that the CPU executes to perform its basic operations. The vendor of the computer platform that comprises the hardware component of the CCS provides the instructions that are stored in the ROM. When the CCS's power is removed then restored, the instructions in the ROM remain unchanged. The dynamic random access memory ("DRAM") 411 includes instructions that the CPU executes to perform selected tasks. The DRAM also stores the data that is used by the instructions executed by the CPU. When the CCS's power is removed then restored, the information in the DRAM is lost. The CCS uses the power management unit 412 to supply and regulate the power required to operate the key components of the CCS. The CCS uses the output management unit 413 to interface with output devices, such as a monitor. The CCS uses the network interface card ("NIC") 414 to interface with external networks, including an Ethernet network, public switched telephone network and a wireless network. The CCS uses the cryptographic unit 415 to support secure communications with external systems, such as the payment processor system and secure notification management system. The vendor of the computer platform, which is used by the CCS, provides the local bus, expansion bus, ROM, DRAM, power management unit, output management unit, network interface card, clock, CPU and cryptographic unit. Specific components, including the NIC, can be obtained from alternate commercial vendors including CompUSA and Office Depot.

Figure 5:
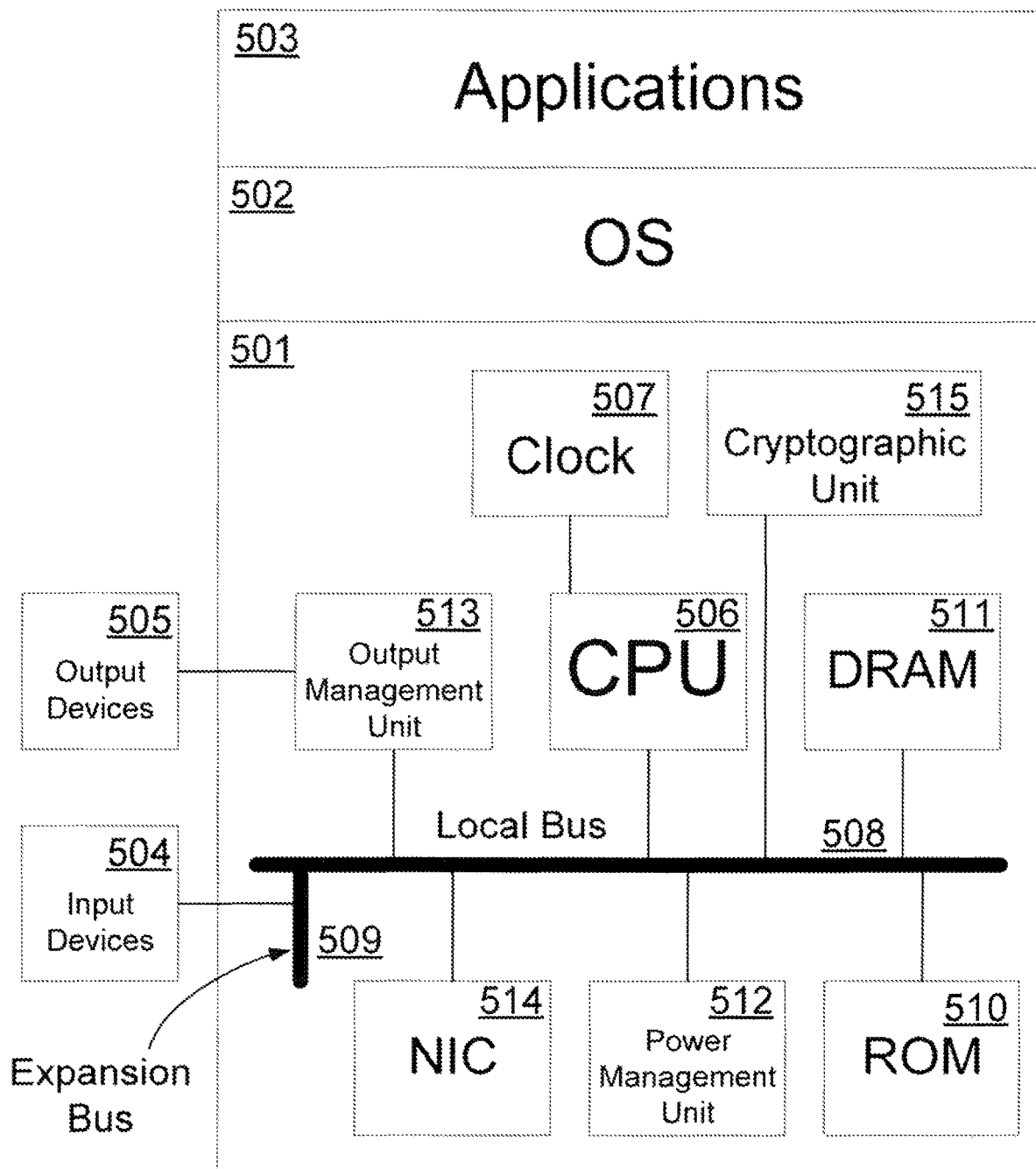
FIG. 5 illustrates a first embodiment of the user interface to the present invention.

FIG. 5 illustrates the key components of the user interface in a first embodiment of the apparatus and method of the present invention.

In a preferred embodiment of the present invention the user interface device 301 is a conventional personal computer that includes, the main hardware 501, the operating system 502, software applications 503, input devices 504 and output devices 505. The main hardware 501 in the user interface device includes a number of key components including the central processing unit ("CPU") 506, clock 507, local bus 508, expansion bus 509, read only memory ("ROM") 510, dynamic random access memory ("DRAM") 511, power management unit 512, output management unit 513, network interface card ("NIC") 514 and cryptographic unit 515. These components are substantially the same as the similarly named components in the CCS as illustrated in FIG. 4. They also perform substantially the same functions and are available from the same vendors. The key differences are that the components in the CCS have higher performance requirements than the equivalent components in the user interface device. In addition, the user interface device includes, commercial software applications such as a word processor application and graphical design application. An example of a word processor application that can be used by the present invention is Microsoft Word. An example of a graphical design application that can be used by the present invention is Microsoft Visio. Examples of higher performance components for the CCS are a faster clock speed, a more powerful CPU and higher capacity DRAM.

FIG. 6 illustrates the key components of the Data Storage System in a first embodiment of the apparatus and method of the present invention.

The data storage system 207 is a conventional hard disk drive that includes non-volatile, magnetic-based hard disk storage that stores digitally encoded data. The data is retained in the data storage system after power is removed then restored. A plurality of suppliers manufacture data storage systems that can be used by the present invention including EMC, Western Digital, Seagate, Maxtor, and Hitachi. The data storage system is comprised of a plurality of databases that are described below. The present invention can use one of a plurality of database systems to house the databases including Oracle and SQL database systems. The CCS stores the data in the Data Storage System in an encrypted format.

The CCS uses the CCS database 601 to store information about how users are using of the CCS. The CCS database contains a plurality of fields including a unique reference key for each record in the CCS database, the unique reference key of each user who has logged into the CCS and tracking information about the functions of the CCS used by each user during each login session.

The CCS uses the administration database 602 to store information about the website, the mobile website, and the mobile application for the CCS as well as information about the maintenance and support of the CCS. The administration database contains a plurality of fields including a unique reference key for each record in the administration database, the type of information, the actual information, and corresponding meta data.

The CCS uses the customer database 603 to store information about customers. For each customer, the customer database contains a plurality of fields including a unique reference key for each record in the customer database, the customer's identifier, location, contact phone numbers, email address, login credentials for the CCS and information about the customer's symmetric encryption key, public encryption key, and private encryption key. This information does not give the CCS access to the actual encryption keys.

The CCS uses the vendor database 604 to store information about vendors. For each vendor, the vendor database contains a plurality of fields that include a unique reference key for each record in the user database, the vendor's identifier, location, contact phone numbers, email address, login credentials for the CCS and information about the vendor's symmetric encryption key, public encryption key, and private encryption key. This information does not give the CCS access to the actual encryption keys.

The CCS uses the authorization database 605 to store information about authorization requests. The authorization database contains a plurality of fields including a unique reference key for each authorization request, the corresponding vendor, the corresponding the customer, the authentication information, and the outcome of each request.

The CCS uses the supplier database 606 to store information about suppliers. For each supplier, the supplier database contains a plurality of fields that include a unique reference key for each record in the supplier database, the supplier's unique identifier or name, location, contact phone numbers, email address, login credentials for the CCS and information about the supplier's symmetric encryption key, public encryption key, and private encryption key. This information does not give the CCS access to the actual encryption keys.

The CCS uses the order database 607 to store information about orders. The order database contains a plurality of fields including a unique reference key for each record in the order database, the type of order, the product, the customer, the vendor, the unique reference key for the authorization authority, and the unique reference key for the terms and conditions of use for each vendor.

The CCS uses the audit database 608 to save and archive transactional information about CCS activities such as transactions. The audit database contains a plurality of fields including a unique reference key for each record, information about each activity performed by the CCS, the time that the activity occurred, and the unique reference key of the person who initiated the activity.

The CCS uses the terms and conditions database 609 to store the terms and conditions of use specified by the customer for each vendor who has made a bid for each order. The terms and conditions database contains a plurality of fields including a unique reference key for each record, the unique reference key for the corresponding customer, the unique reference key for the corresponding vendor, date and time stamp, and the terms and conditions specified by the customer.

The CCS uses the product database 610 to store information about vendor's products. The product database contains a plurality of fields including a unique reference key for each record, the unique reference key for the corresponding vendor, the unique reference key for the corresponding customer, the product's price, and a product description.

The CCS uses the bid database 611 to store information about the bids made by each vendor. The bid database contains a plurality of fields including a unique reference key for each record, the unique reference key for the corresponding order, the content of the bid, the terms and conditions of the bid, the meta data associated with a bid, and the date and time stamp for each bid.

The CCS uses the bulk order database 612 to store information about each bulk order sent from vendors to suppliers. The bulk order database contains a plurality of fields including a unique reference key for each record, the unique reference key for the corresponding vendor, the unique reference key for the corresponding supplier, the content of the bulk order, terms and conditions, meta data, and the date and time stamp for each bulk order.

The CCS uses the transactions database 613 to store information about each transaction. The transactions database contains a plurality of fields including a unique reference key for each record, the unique reference key for the corresponding vendor, the unique reference key for the corresponding customer or supplier, the unique reference key for the corresponding order or bulk order, and the date and time stamp.

The CCS uses the notification database 614 to save and archive information about notifications. The notification database also stores links to templates for the different types of notification messages. A notification is a message sent to a user to inform that user that an event has occurred, such as a transaction. For each notification, the notification database contains a plurality of fields including a unique reference key for each record, the type of event that has caused the 620 notification (e.g., an offer), the unique reference key for the event that has caused the notification (e.g., the unique reference key for a specific order), the type of template to use for the notification, the unique reference key for the user to be notified (e.g., unique reference key for the vendor), the date and time of the event that caused the notification, the 625 date and time that the notification was sent, the title of the notification, the message within the notification, the unique reference key for each user who shall receive a carbon copy of the notification and the unique reference key for each user who shall receive a blind copy of each notification.

The CCS uses the encryption database 615 to store information about the symmetric encryption keys, private encryption keys, and public encryption keys. The encryption database contains a plurality of fields including a unique reference key for each record, the unique reference key for each user and information about the encryption 635 keys. This information does not give the CCS access to the actual encryption keys.

The CCS uses the workflow management database 616 to store information about the preferred procedure to manage inventory. The workflow management system has its own database that is described 640 below. For each workflow submitted to the CCS, the workflow management database contains a plurality of fields including a unique reference key for each record, a name for the workflow, a description of the workflow, the steps in the workflow and the unique reference key for the type of workflow.

The CCS uses the inventory management database 617 to store information about inventory levels, demand trends and supply constraints. The inventory management database contains a plurality of fields including a unique reference key for each record, the unique reference key for the corresponding product, target inventory levels, demand projections, lead time for supply and other supply constraints.

The CCS uses the payment processor database 618 to store information about payments submitted by users of the present invention. The payment processor system has its own database that is described below. However, each payment that is submitted to the CCS is stored in the payment processor database. For each payment submitted to the CCS, the payment processor database contains a plurality of fields including a unique reference key for each record, the buyer's payment credentials, the amount of the payment, the payment method, the type of transaction, the date and time that the payment was submitted, whether the payment was accepted or rejected and the date and time that the payment was confirmed or rejected. The payment processor can also track volumes per unit time and trigger an alert if a user's volume exceeds predetermined thresholds. For example, a user may only be permitted to spend up to $300 per day or $5,000 per month say on a 665 given type of product.

Figure 7:
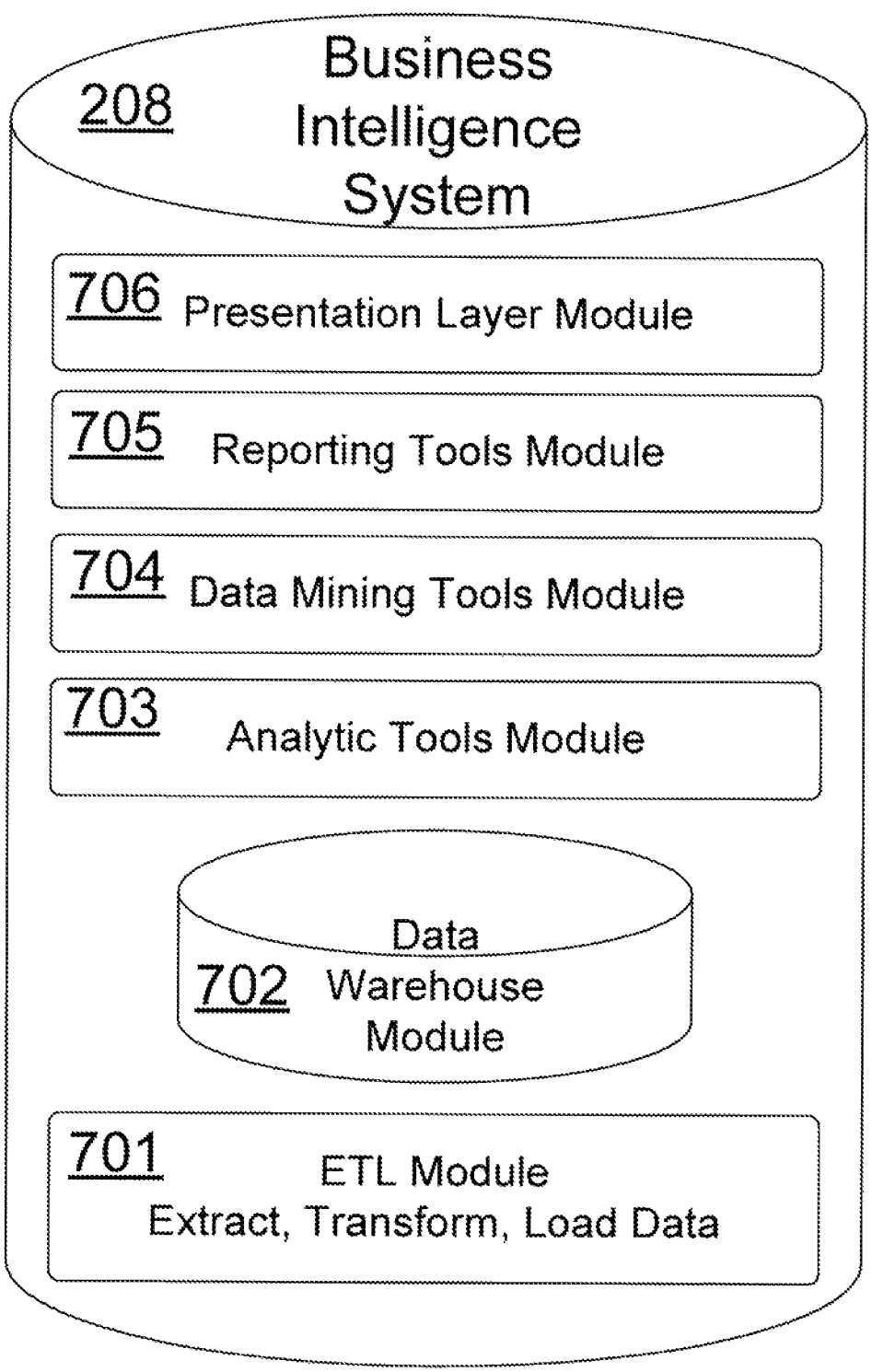
FIG. 7 illustrates a first embodiment of the business intelligence system ("BIS") of the present invention.

FIG. 7 illustrates the key components of the Business Intelligence System in a first embodiment of the apparatus and method of the present invention.

The Business Intelligence System 208 is operatively coupled to the CCS. Many companies supply business intelligence systems that can be used by the present invention including Microstrategy and Oracle. The CCS uses the business intelligence system to analyze data stored in the plurality of databases that comprise the data storage system 207. The purpose of the analysis by the business intelligence system is to identify trends, patterns and relationships that may be hidden in the data stored in the data storage system.

The present invention uses a commercial Business Intelligence System 208 that is illustrated in FIG. 7. It includes a plurality of modules including an extract, transform and data load "ETL" module 701, a data warehouse module 702, an analytic tools module 703, a data mining module 704, a reporting tools module 705 and a presentation layer module

706. The main purpose of a business intelligence system is to enable organizations to capture, process and analyze vast amounts of data from a plurality of sources then identify trends, patterns and relationships that can facilitate business decision-making.

The ETL module 701 is the interface between the Business Intelligence System and the CCS. The main purpose of the ETL module is to transfer data from the CCS to the data warehouse. Using ETL tools to operatively couple a system, such as the Business Intelligence System, to the CCS is explained above in the description of FIG. 2.

The data warehouse module 702 is a database built in a commercial storage system substantially the same as the data storage system described in FIG. 6. The data warehouse module contains a copy of a pre-determined subset of the total data that is available in the data storage system 207. The system administrator user specifies the data in the data storage system that the system administrator wants to use for business analysis. The installation engineer configures the ETL module to extract that pre-determined data from the source database in the data storage system, then configures the ETL module to transform that data into a format that is compatible with the data warehouse, then configures the ETL module to load the transformed data into the pre-determined database locations in the data warehouse module. The installation engineer also configures the ETL module to repeat this extract, transform and data load procedure periodically. Many vendors offer commercial data warehousing solutions including Hyperion, Microstrategy and Oracle.

The analytic tools module 703 includes standard online analytical processing ("OLAP") functionality. OLAP software enables users to create various views and representations of data in the data warehouse. OLAP functionality enables the system administrator user to access, analyze and model business issues and share the information that is in the data warehouse. Many vendors offer commercial data warehousing and OLAP solutions including Hyperion, Microstrategy and Oracle. The OLAP council creates OLAP standards.

The data mining tools module 704 enables the system administrator user to discover trends, patterns and relationships in the data stored in the data warehouse module. Data mining software is designed to analyze large volumes of data using sophisticated data search techniques then apply statistical methods to discover trends, patterns and relationships in the data. Many vendors offer commercial data mining software including Baan Software, Oracle, SAP, Sybase and Tableau Software. The Data Mining Group is an independent, vendor led consortium that develops data mining standards.

The reporting tools module 705 enables the system administrator user to create reports that display the data stored in the data warehouse as well as information that illustrates the trends, patterns and relationships in the data stored in the data warehouse module. Many vendors offer commercial reporting software including Business Objects, Cognos, Crystal Reports and Microstrategy.

The presentation layer module 706 includes graphics and multimedia interfaces that enable information and reports to be displayed in a user-friendly manner. The reporting tools described above all include a presentation layer module.

Figure 8:
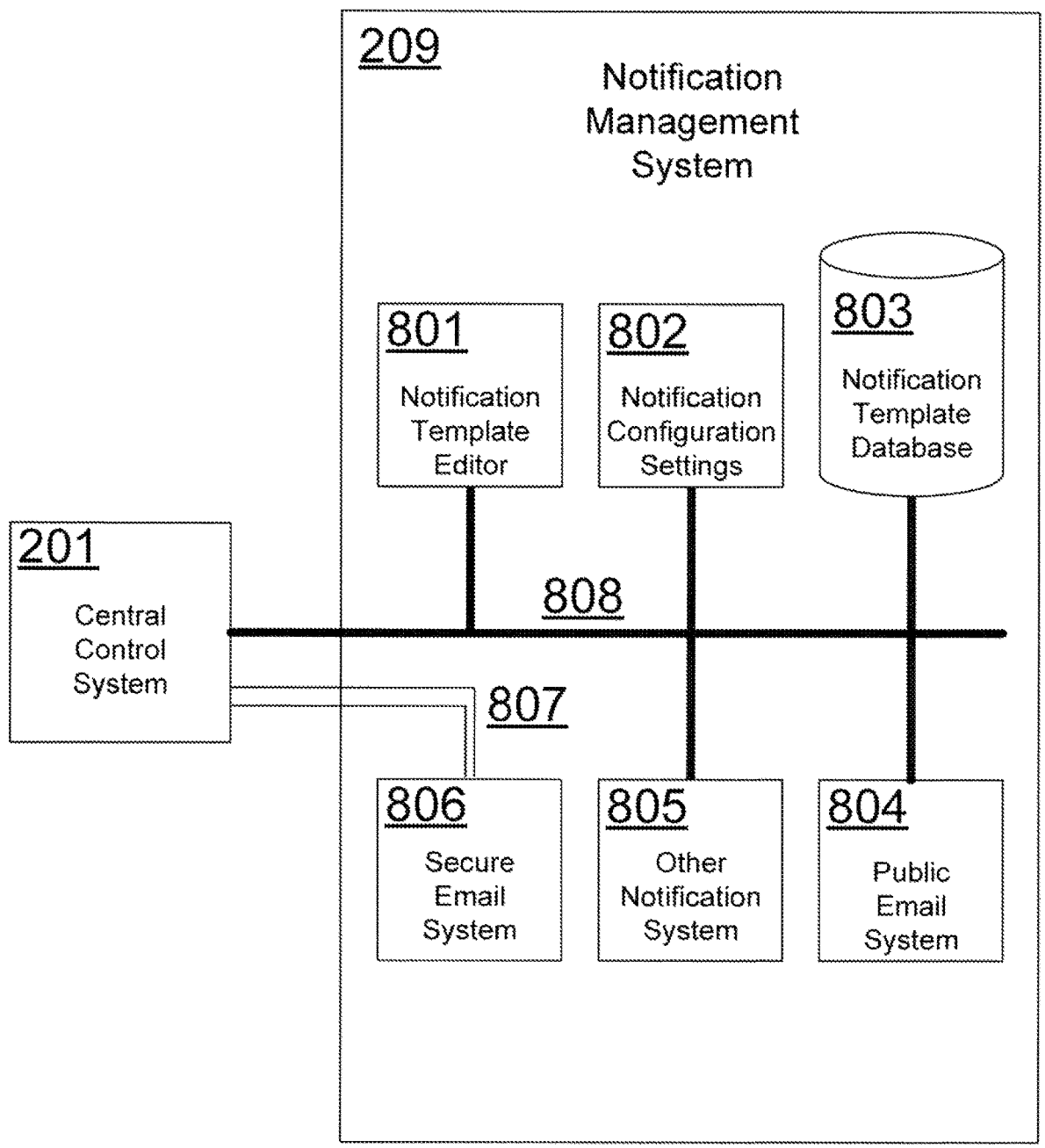
FIG. 8 illustrates a first embodiment of the notification management system ("NMS") of the present invention.

FIG. 8 illustrates the key components of the notification management system in a first embodiment of the apparatus and method of the present invention.

The notification management system 209 is operatively coupled to the CCS. The purpose of the notification management system is to send a notification whenever an event occurs that requires the attention of a user. The CCS sends a notification message via the notification management system to inform the recipient of the notification that a key event has occurred such as a payment has been made. The system administrator user configures the notification management system to monitor a plurality of other events then alert the pre-determined user when the specific event occurs.

FIG. 8 illustrates the Notification Management System used by the present invention. This Notification Management System includes a plurality of modules including a notification template editor 801, a notification configuration settings module 802, a notification template database 803, at least one public email system 804, at least one other notification system 805, a secure email system 806, a virtual private network (VPN) 807 and a wide area network 808.

The notification template editor 801 is a standard commercial word processor that the system administrator user can use to draft notification templates. The system administrator user then saves those templates into the notification template database 803. The system administrator inserts bookmarks into the notification template where information must be added to convert the template into an actual notification message. For example, the system administrator inserts a bookmark for the notification address (such as an email address) of the pre-determined user to whom the notification shall be sent.

The system administrator user uses the notification configuration settings module 802 to configure and enable the notifications. For example, in one embodiment of the present invention the system administrator user will configure a notification to be sent whenever a commitment is made to an offer. The configuration information will include a plurality of information including the event (e.g., an order), the contact information for the user to be notified, the title of the notification, information about the order, and related meta data.

The notification template database 803 is used to store notification templates. For each notification template, the notification template database contains a plurality of fields including a unique reference key for each record, the unique reference key for the type of event for which the notification template shall be used, the title of the event, the standard message in the notification, the unique reference key for each user who shall receive the notification, the unique reference key for each user who shall receive a carbon copy of the notification and the unique reference key for each user who shall receive a blind copy of the notification. When a predetermined event occurs, the CCS will identify the pre-determined users to whom the notification shall be addressed, the predetermined users who shall receive a copy of the notification and the predetermined users who shall receive a blind copy of the notification. The CCS passes this information and a plurality of other information, such as the predetermined template to use for the specific event, to the notification management system that extracts information from the notification database 614 to fill in the blanks in the predetermined notification template.

The public email system 804 enables users to receive notifications from the CCS by email. It also enables users to send emails to the CCS. A plurality of public email systems are available to users including yahoo mail, hotmail, and gmail. When a user registers with the CCS, that user must input an email address that the CCS will use to send notifications.

To one skilled in the art, it will be evident that the CCS can use other notification systems 805 to notify users that an event has occurred. Other possible notification systems include instant messaging, text messages, telephone service, and wireless services. When the user registers with the CCS, the user can input their contact information for their alternative notification systems.

The secure email system 806 enables users to receive secure notifications from the CCS by email. It also enables users to send secure emails to the CCS. A plurality of vendors provide secure email services, such as Zix mail. When a user registers with the CCS, the CCS will give that user a secure email address. The CCS is connected to the secure email system by a virtual private network (VPN) 807. Commercial telephone companies such as Verizon provide virtual private networks. These VPN circuits provide more security than a regular telephone circuit. The other components of the notification management system are interconnected by a combination of wide and local area networks 808. Such networks are described above in the discussion of FIG. 3.

When an event occurs that requires a notification that does not include sensitive information, the CCS will send the notification to the user's secure email address and also to the user's public email address. When an event occurs that requires a notification that does include sensitive information then the CCS will send the notification to the user's secure email address. The CCS will also send a different notification to the user's public email address informing that user that a secure notification message has been sent to that user's secure email address. The user will then log in to the CCS to access the secure notification.

Figure 9:
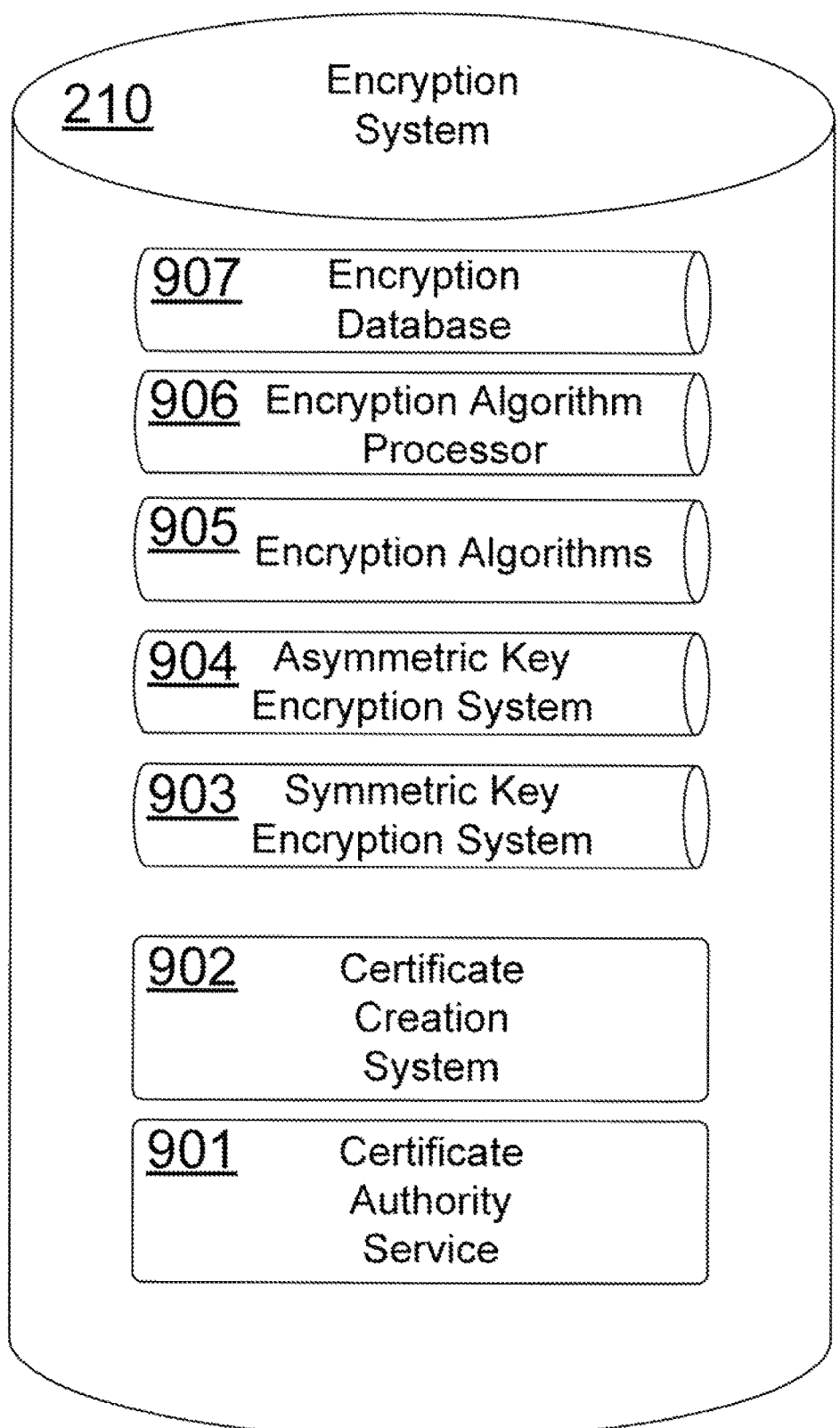
FIG. 9 illustrates a first embodiment of the encryption system of the present invention.

FIG. 9 illustrates the key components of the Encryption System 210 which is operatively coupled to the Central Control System. The Encryption System used by the present invention is comprised of a plurality of modules including a certificate authority service 901, a certificate creation system 902, a symmetric encryption key encryption system 903, an asymmetric key encryption system 904, encryption algorithms 905, an encryption algorithm processor 906, and an encryption database 907.

The certificate authority service 901 is independent of both the customer and vendor. It is a source that is trusted by the customer and the vendor and confirms that they both are who they say they are. In addition, the certificate authority service provides the customer's and vendor's public encryption keys to each other. In summary, the certificate authority service authenticates the customer and the fact that the authorization has not been altered.

Authentication is used with encryption to create a secure communication environment. Standard authentication systems include user name and password, pass cards that use a magnetic strip similar to that on a credit card, smart cards that have an embedded chip, and digital signatures based on the Digital Signature Standard (DSS) that uses the Digital Signature Algorithm (DSA). More modern forms of encryption use biometrics for authentication. Biometrics use biological information to verify a user's identity. Biometric authentication methods include fingerprint scans, retina scans, face scans and voice identification. Biometric authentication eliminates many of the risks associated with not knowing who is using an authenticated input or output device. Biometric authentication therefore provides an additional level of security over device level authentication for secure personal communications.

The certificate creation system 902 generates a certificate for each user in the form of a piece of code, or a large number, that says that the user is trusted by the certificate authority. When the customer, for example, sends an order to the vendor, that customer also sends his public encryption key and certificate to the vendor, to validate three things: 1) that the certificate comes from a trusted party; 2) that the certificate is currently valid; and 3) that the certificate has a relationship with the present invention.

The symmetric key encryption system 903 generates a secret code for each user. The encryption system uses this secret code, or encryption key, to encrypt information. Modern encryption systems use the advanced encryption standard (AES), which uses 128-, 192- or 256-bit encryption keys. These create more than 2128 possible key combinations for the encryption key. For a hacker trying to guess the encryption key, this is like trying to find one specific grain of sand in the Sahara Desert. It would take a hacker so long to guess the correct key combination that this encryption standard is considered to be secure for the foreseeable future. For symmetric key encryption, the same key is used to encrypt and decrypt a message. The use of symmetric encryption keys and asymmetric encryption keys in the present invention is described below.

The asymmetric key encryption system 904 generates two secret codes for each user, a public encryption key and a private encryption key. When a first user wants to send an encrypted message to a second user but does not want to risk sending the encryption key then the asymmetric key encryption system is used. The use of symmetric encryption keys and asymmetric encryption keys in the present invention is described below. For example, in the present invention, when the customer wants to send a symmetric encryption key to a vendor, that customer uses the public encryption key of the selected vendor to encrypt the symmetric encryption key. The vendor then uses his or her private encryption key to decrypt the symmetric encryption key. This is possible because an encryption algorithm is used where the algorithm, or function "F" is such that, F(clear symmetric encryption key, buyer's public encryption key)=encrypted symmetric encryption key and F(encrypted symmetric encryption key, buyer's private encryption key)=clear symmetric encryption key. Therefore, by using the same algorithm ("F") a user's private encryption key can be used to decrypt the symmetric encryption key that was encrypted by the same user's public encryption key (U.S. Pat. No. 8,374,354 B2). One advantage of the present invention is that the encryption and decryption are performed at the user interface preferably initiated by biometrics. In this case, the present invention only has access to the encrypted version of the symmetric encryption key and cannot decrypt the symmetric encryption key. The symmetric encryption key is used to encrypt and decrypt the information. In other systems, encryption is used to secure the transmission of digital media from the user to the system. This enables the information to be decrypted by the system operator which creates the risk of hacking supported by rogue employees of the system operator.

A number of encryption algorithms 905 have been created that can be used by the present invention. Symmetric key encryption algorithms include The Data Encryption Standard (DES) was adopted as a U.S. government standard in 1977 and as an ANSI standard in 1981. Triple-DES is a way to make the DES dramatically more secure by using the DES encryption algorithm three times with three different keys, for a total key length of 168 bits. Also called "3DES," this algorithm has been widely used by financial institutions and by the Secure Shell program (ssh). Blowfish is a fast, compact, and simple block encryption algorithm invented by Bruce Schneier. The algorithm allows a variable-length key, up to 448 bits, and is optimized for execution on 32- or 64-bit processors. The algorithm is unpatented and has been placed in the public domain. Blowfish is used in the Secure Shell and other programs. Asymmetric key encryption algorithms include the Rivest Shamir Adleman (RSA) public encryption key algorithm that can be used for encrypting and signing data and Elliptic Curve Cryptography (ECC) which provides similar functionality to RSA for smaller devices like cell phones. It requires less computing power than RSA. ECC encryption systems are based on the idea of using points on a curve to define the public/private encryption key pair. The present invention can use these and other standard encryption algorithms.

The encryption algorithm processor 906 is the code that is used to encrypt and decrypt information. The present invention includes its own code for these purposes and also can use other code considered to comply with industry standards. By way of example, sample code that was published by syntx.io (http://syntx.io/basic-symmetric-encryption-example-with-java/) includes the following to encrypt a message using AES as the algorithm:

```
public static final String encrypt(final String message,
final Key key, final IvParameterSpec iv) throws IllegaBlock-
SizeException,
    BadPaddingException, NoSuchAlgorithmException,
    NoSuchPaddingException, lnvalidKeyException,
    Unsupported EncodingException, lnvalidAlgorithmPa-
rameterException {
    Cipher cipher=Cipher.getinstance("AES/CBC/PKCSS-
        Padding");
    cipher.init(Cipher.ENCRYPT_MODE,key,iv);
    byte[ ] stringBytes=message.getBytes( );
    byte[ ] raw=cipher.doFinal(stringBytes);
    return Base64.encodeBase64String(raw);
}
```

The same example from syntx.io published the following code to decrypt the message:

```
public static final String decrypt(final String encrypted,
final Key key, final IvParameterSpec iv) throws lnvalid-
KeyException,
    NoSuchAlgorithmException, NoSuchPaddingException,
    IllegalBlockSizeException, BadPaddingException,
IOException, InvalidAlgorithmParameterException {
    Cipher cipher=Cipher.getInstance("AES/CBC/PKCSS-
        Padding");
    cipher.init(Cipher.DECRYPT_MODE, key,iv);
    byte[ ]raw=Base64.decodeBase64(encrypted);
    byte[ ] stringBytes=cipher.doFinal(raw);
    String clearText=new String(stringBytes, "UTF8");
    return clearText;
}
```

It will be evident to one skilled in the art that more robust algorithms are available for use, can be developed, and can be used by the present invention.

The encryption database 907 is substantially the same as the encryption database 615 in FIG. 6. It stores the encryption information required by the other modules described above that comprise the encryption system.

Figure 10:
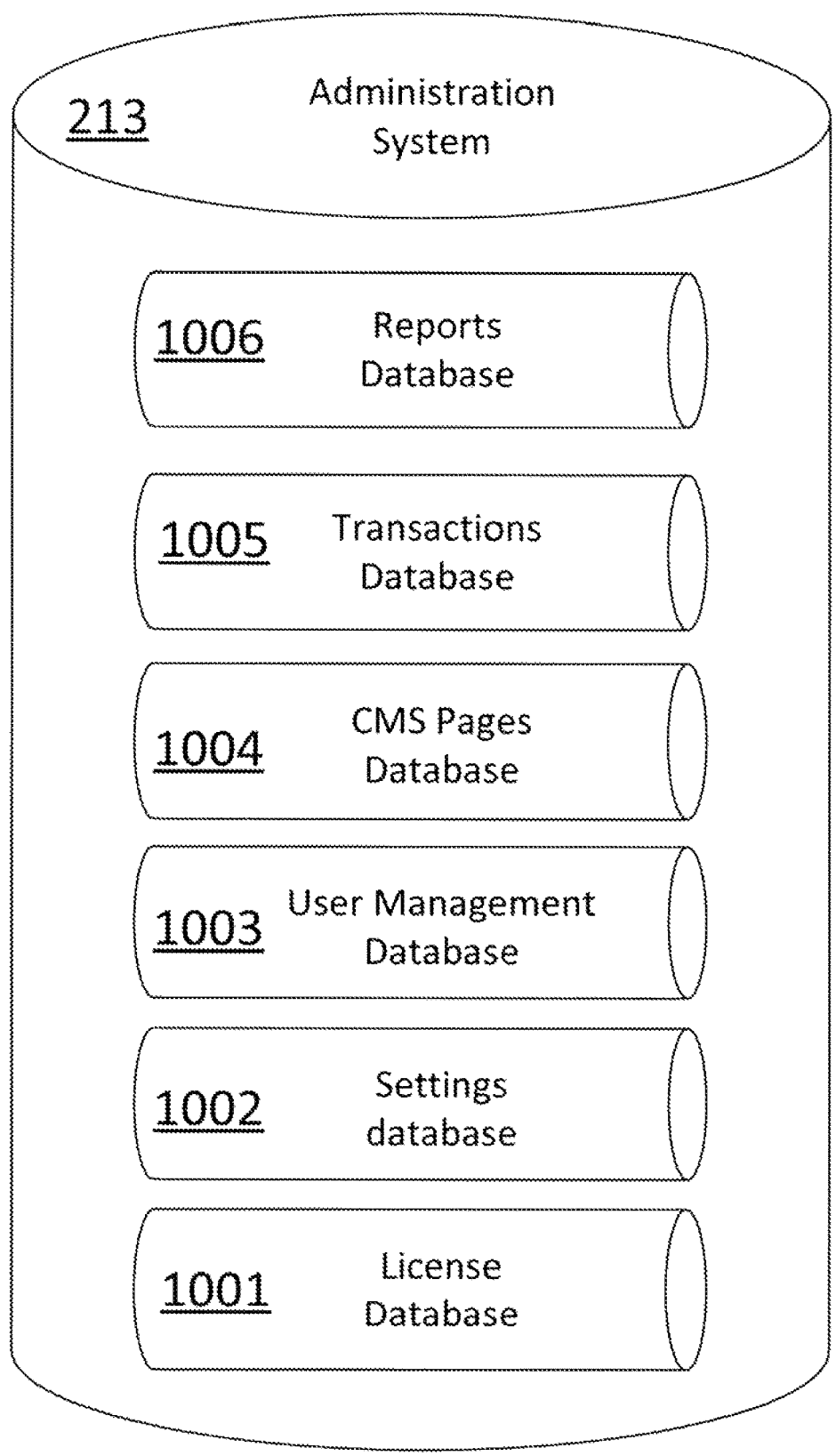
FIG. 10 illustrates a first embodiment of the administration system of the present invention.

FIG. 10 illustrates the key components of the Administration System 213 which is operatively coupled to the Central Control System. The Administration System used by the present invention is comprised of a plurality of modules including a license database 1001, a settings database 1002, a user management database 1003, a CMS pages database 1004, a transactions database 1005, and a reports database 1006.

The license database 1001 stores information about which users are authorized to use the present invention. The license database contains a plurality of fields including a unique reference key for each record in the license database, the unique reference key of each user, and licensing and payment information for each user.

The settings database 1002 stores configuration information for the present invention. Examples of settings include the percentage fee received by the operator of the present invention for each transaction, managing the list of default security questions for lost password recovery, and the payment options that are available, such as pay in advance, pay on delivery and pay on acceptance.

The user management database 1003 stores information about users. This information includes the type of user, contact information, and the user's status such as active or inactive.

The CMS pages database 1004 stores information about the web site pages and mobile user interface for the present invention. This module enables the system administrator to edit the content on these pages. Example pages include "About Us", "Frequently Asked Questions", "Home", and the "User Agreement".

The transactions database 1005 stores information about transactions in the present invention. The transactions database is substantially the same as the transactions database 613 in the data storage system 207. The transactions database in the administration system enables the system administrator to manage transactions and resolve issues.

The reports database 1006 stores information about reports in the present invention. These reports help the system administrator manage the present invention. Example reports include the amount of the available storage used, peak and average CPU utilization in system servers, and peak and average number of users.

FIG. 11 illustrates an overview of the Workflow Management System ("WMS") in a first embodiment of the apparatus and method of the present invention. The Workflow Management System is used to guide the inventory management process for vendors 214 and is operatively coupled to the CCS. Many commercial WMS options are available that can be used by the present invention. However, the present invention uses a modified version of the WMS taught in co-owned application Ser. No. 10/716,747 (Nov. 18, 2003).

The WMS enables the system administrator to create a workflow that is the preferred procedure to manage inventory 1101.

The WMS enables the vendor to modify the workflow that is the preferred procedure to manage inventory 1102.

The WMS enables the vendor to save the workflow that is the preferred procedure to manage inventory 1103.

The WMS enables the vendor to activate the workflow that is the preferred procedure to manage inventory 1104. This activation process makes the workflow accessible to vendor users.

The WMS enables a vendor user to start the preferred procedure to manage inventory 1105.

The WMS enables the vendor user to open the selected procedure to manage inventory 1106.

The WMS guides the vendor user through the preferred procedure to manage inventory 1107.

The WMS saves the information created at each completed step in the process and also saves drafts for the incomplete steps 1108. The user can complete the drafts at a later time.

The WMS enables the vendor user to resume the preferred procedure to manage inventory until the cycle is complete 1109. Each cycle is the process of analyzing actual product sales data, determining demand then placing bulk orders with suppliers to replenish inventory.

Preferred Embodiment of the Present Invention

Figure 12:
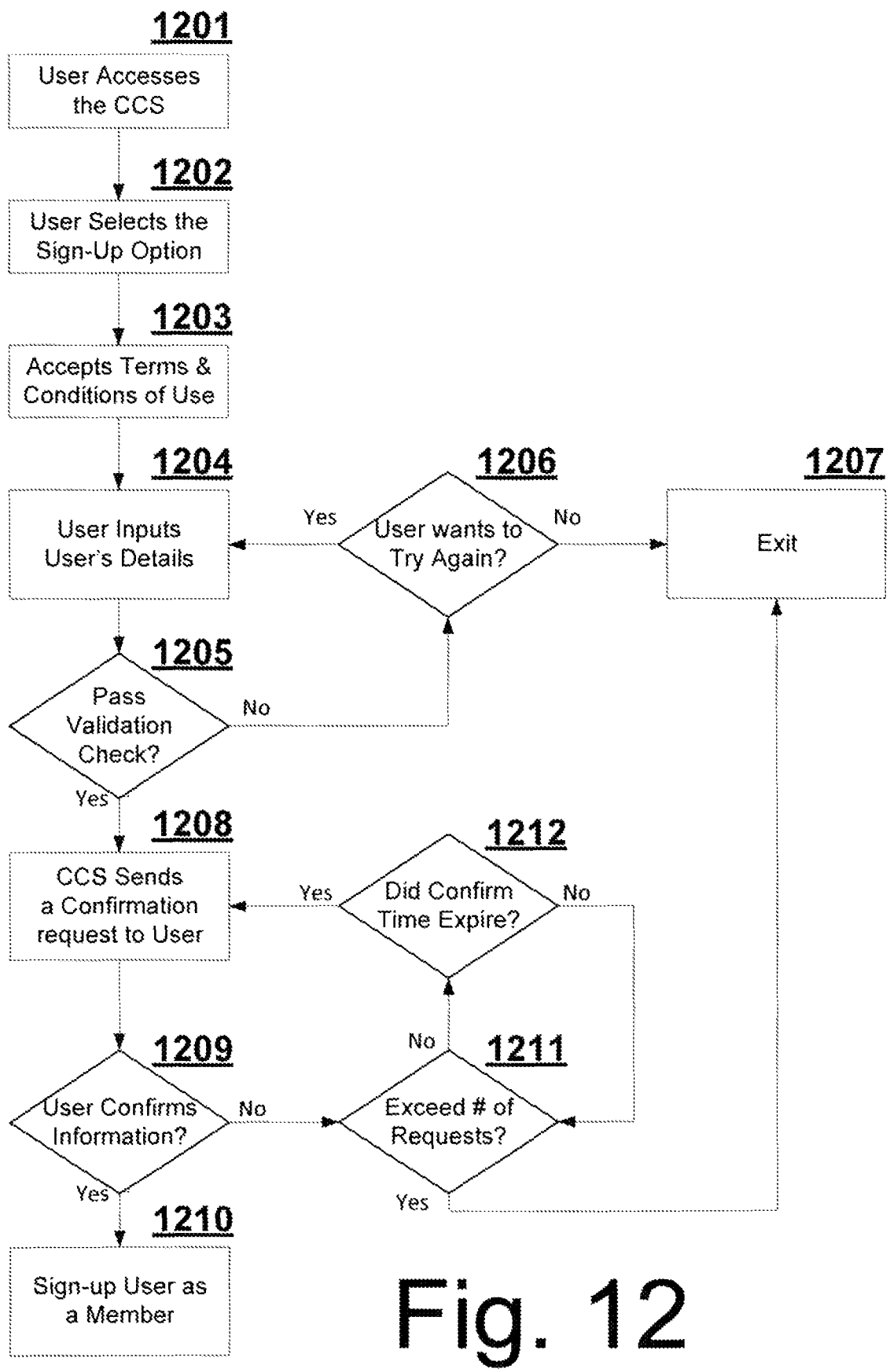
FIG. 12 illustrates a first embodiment of the sign-up procedure for the present invention.

FIG. 12 illustrates the procedure for users to sign-up as members in a first embodiment of the apparatus and method of the present invention.

The user accesses the CCS 1201 then selects the sign-up option 1202. The user then accepts the predetermined terms and conditions of use 1203. The user then inputs the requested user details 1204. These details include name, contact information, user name, password and the other meta data specified above for the user database illustrated in FIG. 6. When the user accesses the CCS after signing up as a member, that user will have to input the user name and password to log into the CCS. The CCS checks the information entered by the user at step 1204 for completeness. If the information is incomplete 1205, the CCS will offer the user the opportunity to complete the information 1206. If the user chooses to try again to complete the information, the CCS returns to step 1204. If the user chooses not to complete the sign up information, the CCS exits the sign-up procedure 1207.

If the information entered by the user is complete 1205, the CCS sends a confirmation request to the user 1208. The CCS will send this confirmation request to the email address entered by the user at step 1204. The user can also select to authenticate using a text message rather than an email. The CCS asks the user to confirm receipt of this request 1209. If the user confirms receipt of the confirmation request as requested by the CCS, the CCS will sign-up the user as a member 1210. If the user does not confirm receipt of the confirmation request, the CCS will determine whether the predetermined maximum number of reminder requests have been exceeded 1211. If the CCS has already sent the predetermined maximum number of confirmation requests, then the CCS will exit the sign-up procedure 1207. If the CCS has sent fewer than the predetermined maximum number of confirmation requests, then the CCS will determine whether the predetermined wait time has been exceeded 1212 before sending another confirmation request to the user. When the predetermined wait time between reminders has been exceeded 1212, the CCS will send another confirmation request to the user 1208. This will return the CCS to step 1208 in the sign-up procedure.

Figure 13:
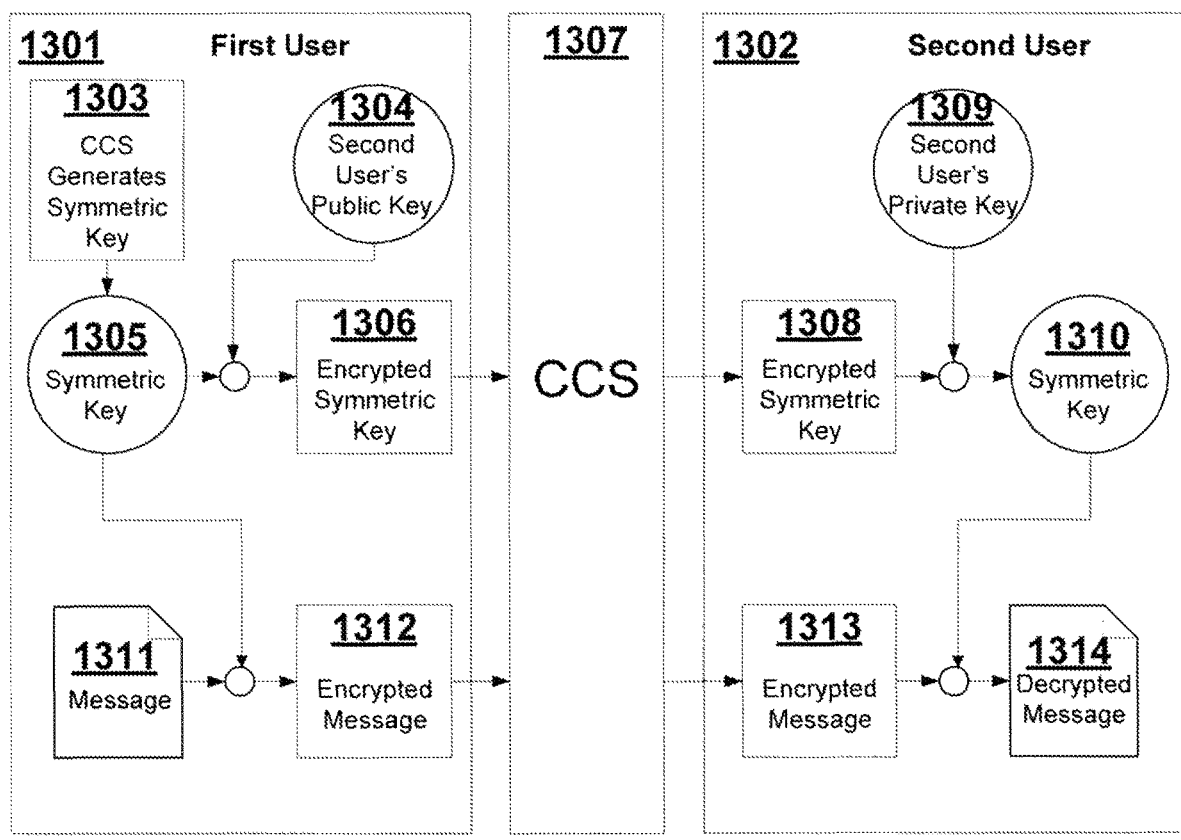
FIG. 13 illustrates a first embodiment of the high level encryption approach for the present invention.

FIG. 13 illustrates the preferred procedure to send a message from a first user 1301 to a second user 1302 through the CCS. When the first user and second user register on the system they download the CCS front end application onto their computer 301. The CCS application is created using standard programming languages such as java, javascript, PH P, HTML, C, C+, and visual basic. The CCS also gives the first user and second user their own symmetric encryption key, private encryption key and public encryption key as described above for the encryption system. The first user and the second user both use the CCS to make their public encryption keys available to other users. When the first user wants to send a message to the second user, the CCS application in the first user's computer 301 generates a new symmetric encryption key 1303 for this transaction. The CCS then uses the second user's public encryption key 1304 to encrypt the symmetric encryption key 1305 and create an encrypted symmetric encryption key 1306. The CCS 1307 then transfers the encrypted symmetric encryption key from the first user to the second user. The CCS front end application on the second user's computer receives the encrypted symmetric encryption key 1308 then uses the second user's private encryption key 1309 to decrypt the encrypted symmetric encryption key and recover the symmetric encryption key 1310 that was generated by the CCS application on the first user's computer for this transaction.

The CCS application on the first user's computer also uses the same symmetric encryption key 1305 to encrypt the target message 1311 and form an encrypted message 1312. The CCS 1307 then transfers the encrypted message from the first user to the second user. The CCS's front end application on the second user's computer receives the encrypted message 1313 then uses the second user's symmetric encryption key 1310 to decrypt the encrypted message and recover the original message 1314 that was sent by the CCS application on the first user's computer. The symmetric encryption key and message cannot be accessed by employees or partners of the CCS platform which minimizes the risk of unauthorized decryption.

Asymmetric encryption is slower than symmetric encryption. The CCS application therefore uses the public encryption key and private encryption key to encrypt and decrypt the symmetric encryption key because the symmetric encryption key is typically much smaller than the user's message. This is a secure method for the CCS to transfer the symmetric encryption key from the first user to the second user. This solution also enables the CCS application to use the faster symmetric key encryption to encrypt and decrypt the target message that is typically much larger than the symmetric encryption key.

Figure 14:
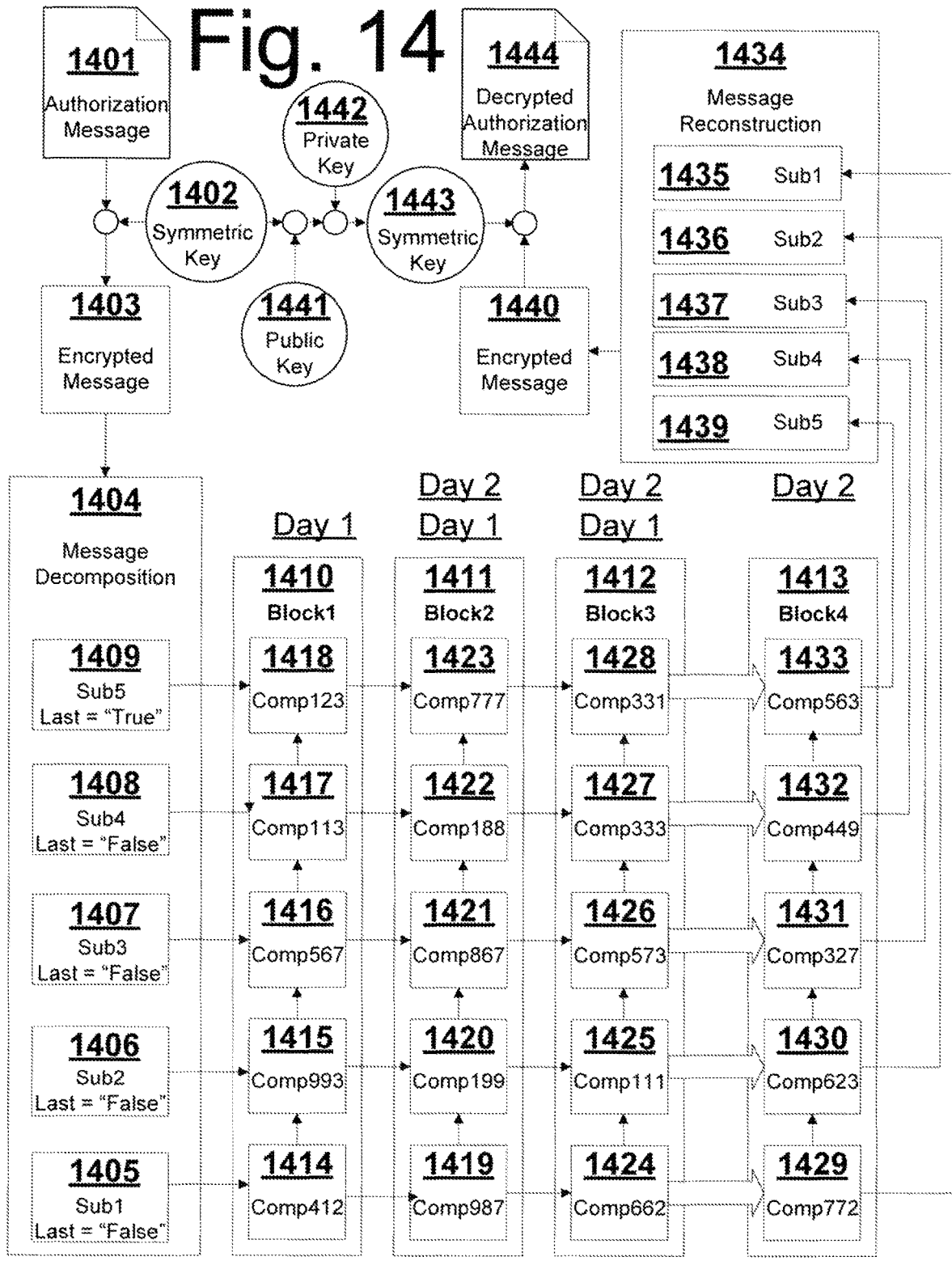
FIG. 14 illustrates a first embodiment of the high level authentication approach for the present invention.

FIG. 14 illustrates the preferred procedure to input and output a secure authorization 1401, such as a prescription for medical products, an authentication certificate for digital media or a reference file for biometric authentication. The CCS application on a first user's computer generates a unique symmetric encryption key 1402 to encrypt each authorization message 1403. The CCS front end application on the user's device generates a different symmetric encryption key for each message. The CCS application on the first user's computer then decomposes the authorization message into a number of subcomponents 1404. A number of tools are available to split a file into subcomponents, such as WinRar and HJSplit. For example, WinRar allows the user to specify the size of each subcomponent. The example in FIG. 14, decomposes the message 1404 into 5 subcomponents Sub1 1405, Sub2 1406, Sub3 1407, Sub4 1408, and Sub5 1409 in that order. It also sets the "last subcomponent flag" to "False" for Sub1 1405, Sub2 1406, Sub3 1407, and Sub4 1408 but sets the "last subcomponent flag" to "True" for Sub5 1409 because Sub5 1409 is the last subcomponent of message 1404. It also sets the counter=1 for Sub1 1405, counter=2 for Sub2 1406, counter=3 for Sub3 1407, counter=4 for Sub4 1408 and counter-5 for Sub5 1409. The CCS application on the first user's computer randomly selects three computers, Comp412 1414, Comp987 1419, and Comp682 1424, from a predetermined list of member computers. Each organization that wants to use this dynamic process to decompose encrypted messages can propose a computer to participate in the consortium of member computers. After the system administrator vets the organization and vets the proposed computer then the vetted computer is added to the list of member computers. The CCS application on the first user's computer, writes the first subcomponent 1405 of the decomposed encrypted authorization message and the counter value (e.g., 1) and the "last subcomponent flag" (e.g., "False") from subcomponent1 (Sub1) to computer 412 (Comp412) 1414. It also writes the same subcomponent1 (Sub1), counter value and "last subcomponent flag" to computer 987 (Comp987) 1419 and the same subcomponent1 (Sub1), counter value and "last subcomponent flag" to computer 662 (Comp662) 1424.

Computer 412 (Comp412) 1414 then randomly selects another computer from the predetermined list of member computers, namely computer 993 (Comp993) 1415. Computer 412 (Comp412) 1414 then instructs the CCS application on the first user's computer to copy subcomponent2 (Sub2), the counter value (e.g., 2) and the "last subcomponent flag" (e.g., "False") 1406 to computer 993 (Comp993) 1415. When Computer 412 (Comp412) 1414 makes this request, it increments its own counter by 1 (e.g., 1+2=2) to know which subcomponent (e.g., Sub2) to request from block 1404 to be sent to computer 993 (Comp993) 1415. Similarly, Computer 987 (Comp987) 1419 randomly selects another computer from the predetermined list of member computers, namely computer 199 (Comp199) 1420. Computer 987 (Comp987) 1419 then instructs the CCS application on the first user's computer to copy subcomponent2 (Sub2), the counter value (e.g., 2) and the "last subcomponent flag" (e.g., "False") 1406 to computer 199 (Comp199) 1420. Further, Computer 662 (Comp662) 1424 randomly selects another computer from the predetermined list of member computers, namely computer 111 (Comp111) Computer 662 (Comp662) 1424 then instructs the CCS application on the first user's computer to copy subcomponent2 (Sub2), the counter value (e.g., 2) and the "last subcomponent flag" (e.g., "False") 1406 to computer 111 (Comp111) 1425.

Computer 993 (Comp993) 1415 then randomly selects another computer from the predetermined list of member computers, namely computer 567 (Comp567) 1416. Computer 993 (Comp993) 1415 then instructs the CCS application on the first user's computer to copy subcomponent3 (Sub3), the counter value (e.g., 3) and the "last subcomponent flag" (e.g., "False") 1407 to computer 567 (Comp567) 1416. When Computer 993 (Comp993) 1415 makes this request, it uses its own counter+1 (e.g., 2+1=3) to determine which subcomponent (e.g., Sub3) to request from block 1404 to be sent to computer 567 (Comp567) 1416. Similarly, Computer 199 (Comp199) 1420 randomly selects another computer from the predetermined list of member computers, namely computer 867 (Comp867) 1421. Computer 199 (Comp199) 1420 then instructs the CCS application on the first user's computer to copy subcomponent3 (Sub3), the counter value (e.g., 3) and the "last subcomponent flag" (e.g., "False") 1407 to computer 867 (Comp867) 1421. Further, Computer 111 (Comp111) 1425 randomly selects another computer from the predetermined list of member computers, namely computer 573 (Comp573) 1426. Computer 111 (Comp111) 1425 then instructs the CCS application on the first user's computer to copy subcomponent3 (Sub3), the counter value (e.g., 3) and the "last subcomponent flag" (e.g., "False") 1407 to computer 573 (Comp573) 1426.

Computer 567 (Comp567) 1416 then randomly selects another computer from the predetermined list of member computers, namely computer 113 (Comp113) 1417. Computer 567 (Comp567) 1416 then instructs the CCS application on the first user's computer to copy subcomponent4 (Sub4), the counter value (e.g., 4) and the "last subcomponent flag" (e.g., "False") 1408 to computer 113 (Comp113) 1417. When Computer 567 (Comp567) 1416 makes this request, it uses its own counter+1 (e.g., 3+1=4) to determine which subcomponent (e.g., Sub4) to request from block 1404 to be sent to computer 113 (Comp113) 1417. Similarly, Computer 867 (Comp867) 1421 randomly selects another computer from the predetermined list of member computers, namely computer 188 (Comp188) 1422. Computer 867 (Comp867) 1421 then instructs the CCS application on the first user's computer to copy subcomponent4 (Sub4), the counter value (e.g., 4) and the "last subcomponent flag" (e.g., "False") 1408 to computer 188 (Comp188) 1422. Further, Computer 573 (Comp573) 1426 randomly selects another computer from the predetermined list of member computers, namely computer 333 (Comp333) 1427. Computer 573 (Comp573) 1426 then instructs the CCS application on the first user's computer to copy subcomponent4 (Sub4), the counter value (e.g., 4) and the "last subcomponent flag" (e.g., "False") 1408 to computer 333 (Comp333) 1427.

Computer 113 (Comp113) 1417 then randomly selects another computer from the predetermined list of member computers, namely computer 123 (Comp123) 1418. Computer 113 (Comp113) 1417 then instructs the CCS application on the first user's computer to copy subcomponent5 (Sub5), the counter value (e.g., 5) and the "last subcomponent flag" (e.g., "True") 1409 to computer 123 (Comp123) 1418. When Computer 113 (Comp113) 1417 makes this request, it uses its own counter+1 (e.g., 4+1=5) to determine which subcomponent (e.g., Sub5) to request from block 1404 to be sent to computer 123 (Comp123) 1418. Similarly, Computer 188 (Comp188) 1422 randomly selects another computer from the predetermined list of member computers, namely computer 777 (Comp777) 1423. Computer 188 (Comp188) 1422 then instructs the CCS application on the first user's computer to copy subcomponent5 (Sub5), the counter value (e.g., 5) and the "last subcomponent flag" (e.g., "True") 1409 to computer 777 (Comp777) 1423. Further, Computer 333 (Comp333) 1427 randomly selects another computer from the predetermined list of member computers, namely computer 331 (Comp331) 1428. Computer 333 (Comp333) 1427 then instructs the CCS application on the first user's computer to copy subcomponent5 (Sub5), the counter value (e.g., 5) and the "last subcomponent flag" (e.g., 'True') 1409 to computer 331 (Comp331) 1428.

Block1 1410 is a copy of the encrypted authorization message distributed across five random computers. Block2 1411 is a second copy of the encrypted authorization message distributed across five different random computers. Block3 1412 is a third copy of the encrypted authorization message distributed across five more random computers. None of the computers in each block know all of the other computers in the block. For example, Comp993 1415 only knows that Comp567 1416 is the next computer in the chain after itself for Block1. It does not know that Comp113 1417 is the next computer after Comp567 1416. This makes the solution more secure because a hacker would have to break into many independent computers to recover the encrypted information then that hacker would need to figure out how to reconstruct the messages and also figure out how to decrypt the information. This additional security is appropriate for the storage of referenceable personal identifiable information such as customer biometrics and prescription information. After a pre-determined period of time, one day say, the CCS application on the first user's computer randomly selects another computer 1429 from a predetermined list of member computers. The CCS application on the first user's computer, writes the first subcomponent of the decomposed encrypted authorization message from subcomponent (Sub1), the counter value (e.g., 1) and the "last subcomponent flag" (e.g., "False") 1405 to computer 772 1429. Similar to above, computer 772 (Comp772) 1429 randomly selects another computer from the predetermined list of member computers, namely computer 623 (Comp623) 1430 then instructs the CCS application on the first user's computer to copy subcomponent2 (Sub2), the counter value (e.g., 2) and the "last subcomponent flag" (e.g., "False") 1406 to computer 623 (Comp623) 1430. Similar to above, computer 623 (Comp623) 1430 randomly selects another computer from the predetermined list of member computers, namely computer 327 (Comp327) 1431 then instructs the CCS application on the first user's computer to copy subcomponent3 (Sub3), the counter value (e.g., 3) and the "last subcomponent flag" (e.g., "False") 1407 to computer 327 (Comp327) 1431. Similar to above, computer 327 (Comp327) 1431 randomly selects another computer from the predetermined list of member computers, namely computer 449 (Comp449) 1432 then instructs the CCS application on the first user's computer to copy subcomponent4 (Sub4), the counter value (e.g., 4) and the "last subcomponent flag" (e.g., "False") 1408 to computer 449 (Comp449) 1432. Similar to above, computer 449 (Comp449) 1432 randomly selects another computer from the predetermined list of member computers, namely computer 563 (Comp563) 1433 then instructs the CCS application on the first user's computer to copy subcomponent5 (Sub5), the counter value (e.g., 5) and the "last subcomponent flag" (e.g., "True") 1409 to computer 563 (Comp563) 1433. This flag indicates that subcomponent5 is the final subcomponent that comprises the authorization message 1401.

Block4 1413 is a fourth copy of the encrypted authorization message distributed across five random computers. The CCS instructs the CCS application on the first user's computer to delete Bock 1 1410 by discarding subcomponent1 (Sub1) from computer 412 (Comp412) 1414. Computer 412 (Comp412) 1414 then instructs Computer 993 (Comp993) 1415 to discard subcomponent2 (Sub2) from computer 993 (Comp993) 1415. Computer 993 (Comp993) 1415 then instructs Computer 567 (Comp567) 1416 to discard subcomponent3 (Sub3) from computer 567 (Comp567) 1416. Computer 567 (Comp567) 1416 then instructs Computer 113 (Comp113) 1417 to discard subcomponent4 (Sub4) from computer 113 (Comp113) 1417. Computer 113 (Comp113) 1417 then instructs Computer 123 (Comp123) 1418 to discard subcomponent5 (Sub5) from computer 123 (Comp123) 1418. In the example illustrated in FIG. 14, on Day 1 Block1, Block2 and Block3 form three copies of the decomposed messages. On Day 2, Block4 is created and Block1 is deleted. This process of creating a new block and deleting an old block continues until the message is no longer required. This causes the three copies of the decomposed message to keep moving dynamically throughout the network of member computers making the information more difficult to find for a hacker.

In order for the CCS application on the second user's computer (such as a pharmacist reviewing a prescription, an intellectual property user reviewing an authentication certificate or a user authenticating a biometric parameter) to reconstruct the authorization message, the CCS application on the first user's computer (such as the prescribing doctor or intellectual property owner) sends a unique authorization identifier ("authorization ID") to the second user (pharmacist or intellectual property user). Alternatively, the first user (e.g., the doctor or intellectual property owner) can give the authorization identifier to the patient or intellectual property reseller who can forward it to the pharmacist or intellectual property user. The pharmacist or intellectual property user uses the unique authorization identifier to request the authorization (e.g., request the prescription or authentication certificate). The CCS verifies the unique authorization identifier then copies subcomponent1 (Sub1) from computer 772 (Comp772) 1429 to the second user's computer 1435. Similarly, computer 772 (Comp772) 1429 knows that computer 623 (Comp623) 1430 is the next computer in Block4 and instructs computer 623 (Comp623) 1430 to write subcomponent2 (Sub2) to the second user's computer 1436. Similarly, computer 623 (Comp623) 1430 knows that computer 327 (Comp327) 1431 is the next computer in Block4 and instructs computer 327 (Comp327) 1431 to write subcomponent3 (Sub3) to the second user's computer 1437. Similarly, computer 327 (Comp327) 1431 knows that computer 449 (Comp449) 1432 is the next computer in Block4 and instructs computer 449 (Comp449) 1432 to write subcomponent4 (Sub4) to the second user's computer 1438. Similarly, computer 449 (Comp449) 1432 knows that computer 563 (Comp563) 1433 is the next computer in Block4 and instructs computer 563 (Comp563) 1433 to write subcomponent5 (Sub5) to the second user's computer 1439. Computer 563 (Comp563) 1433 knows that it is the final computer in the chain because its "last subcomponent flag" is set to "True" indicating that subcomponent5 is the final subcomponent that comprises the authorization message 1401. The second user can alternatively reconstruct the message from the computers in Block3 or Block2 in addition to Block4.

The CCS application on the second user's computer then uses the same decomposition application, such as WinRar or HJSplit, to reconstruct the encrypted authorization message 1440. The CCS application on the first user's computer uses the second user's public encryption key 1441 to encrypt the symmetric encryption key 1402. The first user then uses the CCS to send the encrypted symmetric encryption key to the second user. The CCS application on the second user's computer then uses her private encryption key 1442 to decrypt the symmetric encryption key 1443. The CCS application on the second user's computer then uses the symmetric encryption key 1443 to decrypt the authorization message 1444.

The example in FIG. 14, illustrates three copies of the authorization message one in each of Block1 1410, Block2 1411 and Block3 1412. In the present invention, the number of replicated messages can be reduced to 1 or 2 or increased to more than 3 to provide more or less redundancy in order to match the specific needs of each business requirement.

Figure 15:
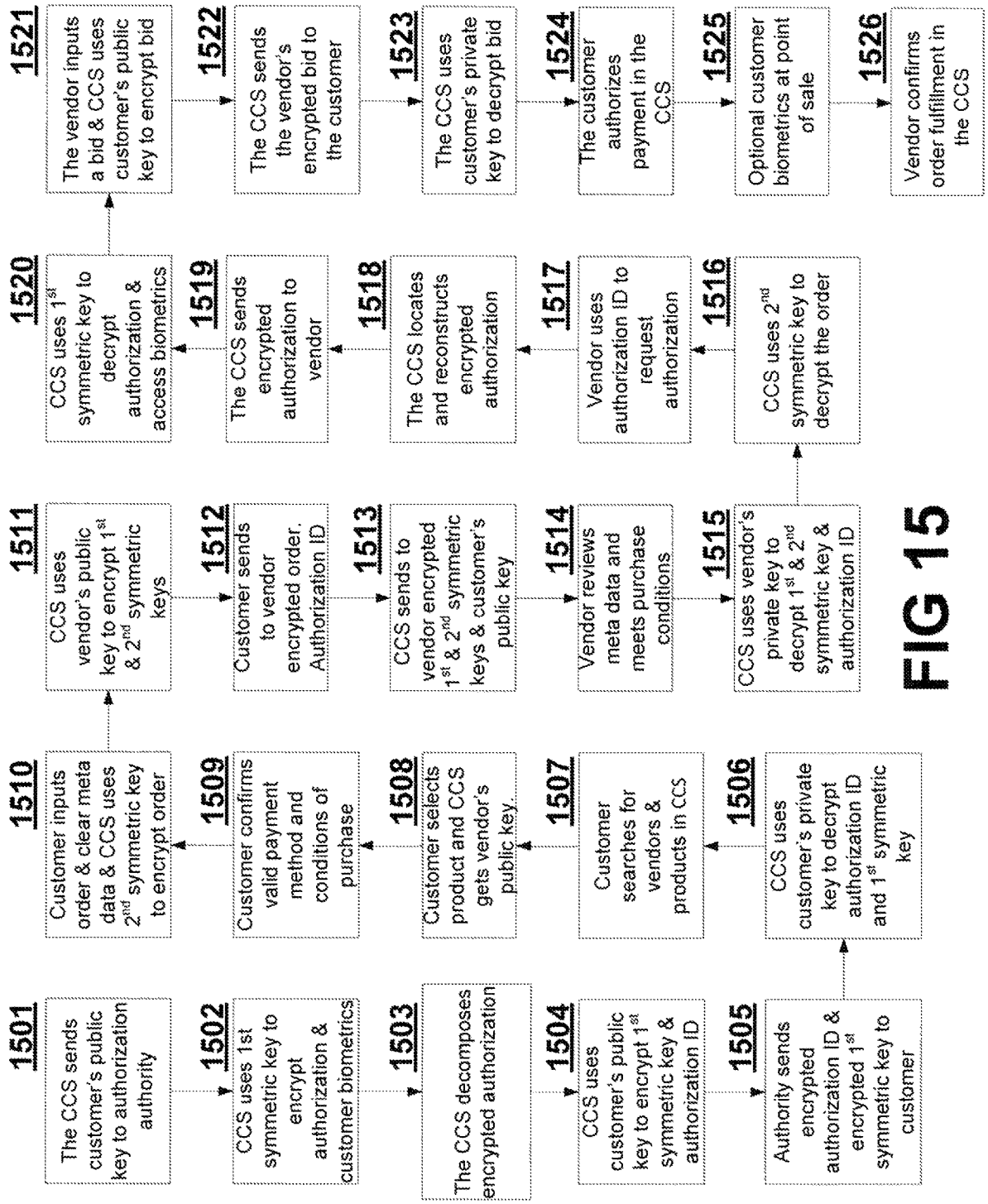
FIG. 15 illustrates a first embodiment of the high level business procedure between a vendor and a customer for the present invention.

FIG. 15 illustrates a high level summary of the preferred customer relationship management embodiment of the present invention. The customer logs in and communicates with the authentication authority, such as a doctor, to receive an authentication for a product, such as a prescription. The CCS sends the customer's public encryption key to the authorization authority ("authenticator") 1501. The CCS generates a first symmetric encryption key that it uses to encrypt the authorization, such as a prescription 1502. The CCS also uses this first symmetric encryption key to encrypt access to the customer's biometric keys. Users input their biometric information when they sign up and can update this information at any time. The customer's biometric information can be used for final customer authentication at the point of sale. The CCS decomposes the customer's authorization as described in FIG. 14 1503. The CCS uses the customer's public encryption key to encrypt the first symmetric encryption key and also to encrypt the unique authentication ID for the customer's authorization 1504. The authorization authority sends the encrypted authorization ID and the encrypted first symmetric encryption key to the customer 1505. On behalf of the customer, the CCS uses the customer's private encryption key to decrypt the unique authentication ID for the customer's authorization and the encrypted first symmetric encryption key 1506. The customer searches for a vendor and product that meets the terms of the authorization as specified in the prescription 1507. The customer selects his desired product and the CCS downloads the selected vendor's public encryption key 1508. The customer confirms a valid payment method in the CCS and specifies the conditions of purchase, such as the vendor must be in a specific state or within a specific distance of the customer's current location 1509. The CCS generates a second symmetric encryption key. The customer inputs his order and clear meta data. The CCS uses the second symmetric encryption key to encrypt the order 1510. The order's clear meta data, that will be transferred to the vendor unencrypted, can be used for many purposes including an invoice number, purchase order number or unique product identifier. The CCS uses the vendor's public encryption key to encrypt the first symmetric encryption key and the second symmetric encryption key 1511. The customer sends the encrypted order and the authorization ID to the vendor 1512. The CCS sends to the vendor the encrypted first symmetric encryption key, the encrypted second symmetric encryption key and the customer's public encryption key 1513. The vendor reviews the order's meta data that is sent in the clear (e.g., unencrypted) and meets the conditions of purchase 1514. The CCS uses the vendor's private encryption key to decrypt the first and second symmetric encryption keys and also to decrypt the authorization ID 1515. The CCS uses the second symmetric encryption key to decrypt the order 1516. The vendor uses the authorization ID to request the authorization 1517. The CCS uses the authorization ID to locate the decomposed encrypted authorization then reconstructs the encrypted authorization (FIG. 14) 1518. The CCS sends the encrypted authorization to the vendor 1519. The CCS uses the first symmetric encryption key to decrypt the authorization and provide validation access to any customer biometrics for the vendor to use at the point of sale 1520. The vendor inputs a bid to supply the product and the CCS uses the customer's public encryption key to encrypt the bid 1521. The CCS sends the vendor's encrypted bid to the customer 1522. The CCS uses the customer's private encryption key to decrypt the bid 1523. The customer authorizes payment in the CCS 1524. Optionally, the vendor can ask the customer to submit biometric validation at the point of sale to ensure that the person picking up the product is the actual customer. This biometric validation can be a finger print scan at the point of sale that is compared with the biometric key stored in the authentication system that is decrypted by the vendor at step 1520. The vendor confirms order fulfillment in the CCS 1526. The CCS closes the transaction.

Figure 16:
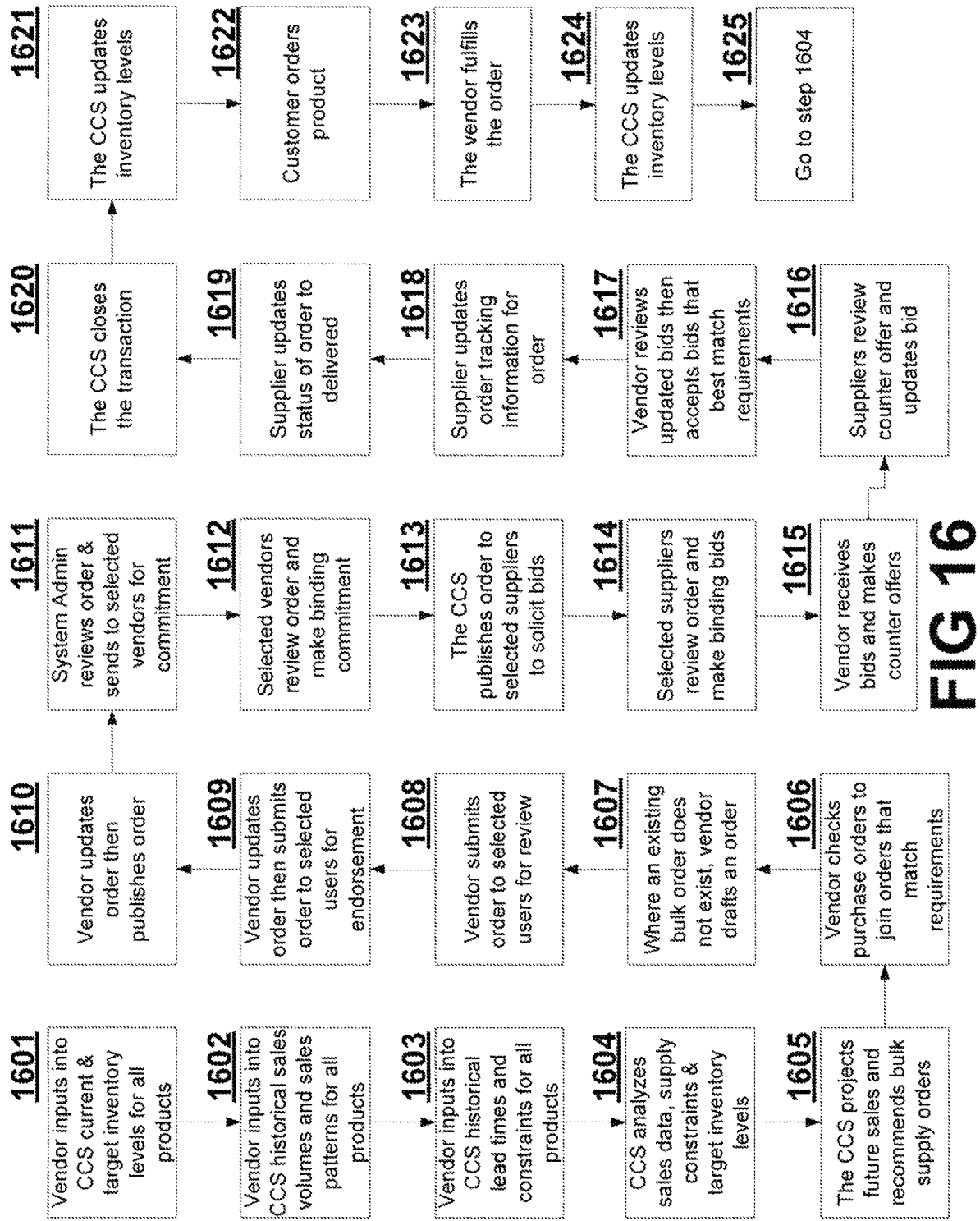
FIG. 16 illustrates a first embodiment of the high level business procedure between a vendor and a supplier for the present invention.

FIG. 16 illustrates a high level summary of the preferred inventory management embodiment of the present invention. The vendor inputs, into the CCS, current and target inventory levels for all products 1601. The vendor also inputs, into the CCS, historical sales volumes and historical sales patterns for all products 1602. The vendor also inputs, into the CCS, historical lead times for supplier's products and other constraints, such as minimum volumes per order 1603. The CCS analyzes the sales data, supplier lead times and constraints, and target inventory levels 1604. The CCS projects future sales based on past sales and also recommends the volume and timing for future bulk orders from suppliers 1605. The business intelligence system 208 is the means to do this analysis and recommend bulk orders. The vendor checks the reverse auction marketplace (taught in co-owned U.S. Pat. No. 8,548,868) to determine whether a different user has already created the desired purchase order that the vendor can join to meet his bulk order needs 1606. If a matching order does not exist in the reverse auction marketplace then the vendor drafts a new purchase order. The vendor includes, in the purchase order, a list of selected suppliers and a list of other selected vendors who may want to join the order 1607. The vendor sends the draft order to other selected CCS users for review and feedback 1608. The vendor updates the order then sends it to other selected CCS users for endorsement 1609. The vendor updates the order then publishes it for acceptance 1610. The system administrator reviews the order and sends it to the predetermined vendors for a binding purchase commitment 1611. The selected vendors, that are predetermined in the order, review the order and make a binding commitment 1612. The CCS publishes the order to the selected suppliers, who are predetermined in the order, to solicit bids 1613. Each selected supplier reviews the order and makes a binding bid 1614. The vendor receives the bid and can make a counter offer 1615. Each supplier reviews their counter offer and updates their bid 1616. The vendor reviews the updated bids then accepts the bid or bids that best match the requirements in the order 1617. The selected supplier updates their order tracking information 1618. Eventually, the supplier updates the status of the order to delivered 1619. The CCS closes the transaction 1620. The CCS updates the vendor's inventory levels 1621. The customer orders new products 1622. The vendor fulfills the customer's order 1623. The CCS updates the vendor's inventory levels 1624. The process then returns to step 1604 where the CCS re-analyzes sales data, supply constraints and target inventory levels to project future sales and recommend future bulk orders from suppliers.

The CCS 201 is operatively coupled to the Administrator Interface 202 which is the means for the system administrator to access the CCS. The CCS is operatively coupled to the customer interface 203 which is the means for a customer to access the CCS. The CCS is operatively coupled to the vendor interface 204 which is the means for a vendor to access the CCS. The CCS is operatively coupled to the authenticator interface 205 which is the means for an authenticator user to access the CCS. The CCS is operatively coupled to the supplier interface 206 which is the means for suppliers to access the CCS. The CCS is operatively coupled to the Data Storage System 207 that is the means to store the data used by the CCS. The CCS is operatively coupled to the Business Intelligence System 208 that is the means to use historical sales and supply information to forecast future sales and recommend future bulk orders. The CCS is operatively coupled to the Notification Management System 209 that is the means to generate and send proactive and reactive notifications to users. For example, the CCS sends a notification to the customer when the CCS receives an authorization from the authorization authority. The CCS also sends a notification to the vendor when it receives an order from a customer. The CCS also sends a notification to the vendor when it receives the authorization for a customer. The CCS also sends a notification to the customer when it receives a bid from a vendor. The CCS also sends a notification to the vendor when the customer accepts a bid and authorizes a payment. The CCS also sends a notification to the vendor when it receives a bulk purchase order that meets the requirements of the vendor. The CCS also sends a notification to a reviewer when the vendor distributes a bulk purchase order for review. The CCS also sends a notification to an endorser when the vendor distributes a bulk purchase order for endorsement. The CCS also sends a notification to other vendors when the CCS publishes the vendor's purchase order for commitment. The CCS also sends a notification to the list of predetermined suppliers when the CCS publishes the vendor's purchase order for bid. The CCS also sends a notification to a supplier when the CCS receives a purchase order that matches the supplier's focus area. The CCS also sends a notification to a vendor when the CCS receives a bid from a supplier in response to that vendor's bulk order. The CCS also sends a notification to a supplier when the CCS receives a counter offer from the vendor in response to the supplier's bid. The CCS also sends a notification to a vendor when the CCS receives an updated bid from a supplier in response to that vendor's bulk order. The CCS also sends a notification to a supplier when the CCS receives a bid acceptance from the vendor in response to the supplier's bid or updated bid. The CCS also sends a notification to a vendor when the CCS receives a status update from a supplier about order fulfillment. The CCS is operatively coupled to the encryption system 210 that is the means to encrypt and decrypt information. The CCS is operatively coupled to the Authentication System 211 that is the means to authenticate a customer's biometric information and to authenticate the customer's authorization to purchase a controlled product. The CCS is operatively coupled to the Payment Processor System 212 that is the means to authorize and capture payments for the CCS. A payment authorization is an interrogation of the user's account to ensure the user has the means to pay. A payment capture is the final transfer of the funds from the source account to the destination account. The CCS is operatively coupled to the Administration System 213 that is the means to administer the CCS. The system administrator user logs into the CCS and configures parameters such as pricing for licenses. The CCS, including its administration system, is the means to configure these parameters. The system administrator user also enhances the CCS as new features are requested by users and implemented by the system administrator. The CCS is created using standard programming languages such as java, javascript, PHP, HTML, C, C+, and visual basic which is the means to enhance the CCS. The CCS can be hosted by a web host such as Godaddy or Host Gator. These web hosts are the means for the system administrator to administer the CCS. The web hosts offer a plurality of services such as backing up the databases, managing content pages using tools like Wordpress, and providing forum services. For example, GoDaddy enables clients to add forums to their website that lets web visitors create discussions and also post comments in discussion threads. The CCS is also the means for the system administrator to manage users who want to use the present invention and to manage trouble tickets that have been raised by users. The CCS is operatively coupled to the Workflow Management System 214 that is the means to manage inventory management workflows in the CCS.

The present invention has a plurality of potential revenue streams including transaction fees, subscription fees, licensing fees, advertising, and the sale of trend information generated by the business intelligence system. Payments can be made using a plurality of methods including credit cards, debit cards, electronic funds transfer, digital cash, checks and barter. In addition, a plurality of options exist for the timing of payments including annual and monthly license payments in advance. It will be evident to one skilled in the art that one or more of the steps in the preferred procedure can be eliminated in specific situations without affecting the usefulness of the present invention.

Anyone skilled in the art will also recognize that the method and apparatus of the present invention has many applications and advantages, and that the present invention is not limited to the representative examples and variations disclosed herein. In addition, the scope of the present invention covers conventional variations and modifications, to the components of the present invention, which are known to those who are skilled in the art.

I claim:

1. A method to enable a user to acquire an authorized product using a secure communication protocol, said method comprising:
   receiving, from a first user terminal associated with a first user, a first profile that includes a first plurality of authentication and authorization information;
   receiving, from a second user terminal associated with a second user, a second profile that includes a second plurality of authentication and authorization information;
   receiving, from the first user terminal associated with the first user, a purchase authorization to acquire a product, an order for said product and a payment authorization for said order;
   receiving, from said first user terminal associated with said first user, a plurality of conditions for said second user to access said purchase authorization, said order and said payment authorization, and displaying, on said second user terminal, said plurality of conditions for review by said second user;
   receiving, from said second user terminal associated with said second user, a bid for said order to supply said product, based on said purchase authorization;
   receiving, from said first user terminal associated with said first user, an acceptance of the bid for said order and an authorization to transfer a payment, based on said payment authorization, to said second user;
   receiving, from said first user terminal associated with said first user, a confirmation of delivery of said product to said first user;
   securing an authorization message, including said purchase authorization, said payment authorization and a user authorization, in a database of independent member computers, based on decomposing an encrypted version of said authorization message into a block of linked subcomponents that are distributed randomly across a first plurality of independent member computers, wherein:
      said block of linked subcomponents is copied randomly to a second plurality of independent member computers to form a plurality of copies of said block of linked subcomponents;
      periodically an oldest block of linked subcomponents is copied randomly to a third plurality of independent member computers to create a newest block of linked subcomponents; and
      said oldest block of linked subcomponents is deleted after said creation of said newest block of linked subcomponents; and
   recombining said encrypted version of said authorization message from its linked but randomly and dynamically distributed subcomponents then recovering said authorization message by decrypting said encrypted version of said authorization message,
   whereby said encrypted version of said authorization message moves dynamically and randomly among a plurality of independent member computers that includes said first plurality of independent member computers, said second plurality of independent member computers, and said third plurality of independent member computers.

2. The method according to claim 1, wherein said first profile includes a plurality of identification information for said first user wherein said plurality of identification information is received from a third user terminal associated with a third user and is stored in said database of independent member computers.

3. The method according to claim 1, wherein said purchase authorization to acquire said product is received from a fourth user terminal associated with a fourth user, wherein said fourth user is authorized to authorize said first user to acquire said product.

4. The method according to claim 1, wherein said order includes a plurality of terms and conditions from said first user to acquire said product including a price, a location, a distribution method and an authorization requirement.

5. The method according to claim 1, wherein said payment authorization includes a plurality of payment options including an escrow service, a cash payment, a credit card, a debit card, an online payment service, an electronic funds transfer, a digital cash equivalent, a check and a barter solution.

6. The method according to claim 1, wherein said plurality of conditions are at least one of an initial date and time when said second user can access said first user's order information, a duration of time that said second user can access said first user's order information, a number of times that said second user can access said first user's order information, a location from which said second user can access said first user's order information, a device on which said second user can access said first user's order information, a plurality of credentials of said second user and a biometric signature of said second user.

7. The method according to claim 1, wherein said bid includes a plurality of terms and conditions to supply said product.

8. The method according to claim 1, wherein said confirmation of delivery includes confirmation of a delivery of said product to said first user and a plurality of feedback about said second user from said first user.

9. The method according to claim 1, wherein a storer user can apply a first biometric signature to initiate an encryption process that submits said authorization message into a distributed encrypted database of independent member computers and a retriever user can apply a second biometric signature to initiate a recovery of said authorization message from said distributed encrypted database of independent member computers, wherein optionally said retriever user is said storer user.

10. A system to enable a user to acquire an authorized product using a secure communication protocol, comprising:
at least one memory configured to store computer program code instructions; and
at least one processor configured to execute said computer program code instructions to:
receive, from a first user terminal associated with a first user, a first profile that includes a first plurality of authentication and authorization information;
receive, from a second user terminal associated with a second user, a second profile that includes a second plurality of authentication and authorization information;

receive, from the first user terminal associated with the first user, a purchase authorization to acquire a product, an order for said product and a payment authorization for said order;
receive, from said first user terminal associated with said first user, a plurality of conditions for said second user to access the purchase authorization, the order and the payment authorization and display, on said second user terminal, said plurality of conditions for review by said second user;
receive, from said second user terminal associated with said second user, a bid for said order to supply said product, based on said purchase authorization;
receive, from said first user terminal associated with said first user, an acceptance of the bid for said order and an authorization to transfer a payment, based on said payment authorization, to said second user;
receive, from said first user terminal associated with said first user, a confirmation of delivery of said product to said first user;
secure an authorization message, including said purchase authorization, said payment authorization and a user authorization, in a database of independent member computers, by said at least one processor which is further configured to encrypt said authorization message then decompose an encrypted version of said authorization message into a block of linked subcomponents that are distributed randomly across a first plurality of independent member computers, wherein said at least one processor is further configured to:
copy said block of linked subcomponents randomly to a second plurality of independent member computers to form a plurality of copies of said block of linked subcomponents;
copy periodically an oldest block of linked subcomponents randomly to a third plurality of independent member computers to create a newest block of linked subcomponents; and
delete said oldest block of linked subcomponents after creating of said newest block of linked subcomponents; and
recombine said encrypted version of said authorization message from its linked but randomly and dynamically distributed subcomponents then decrypt said encrypted version of said authorization message to recover said authorization message,
whereby said encrypted version of said authorization message moves dynamically and randomly among a plurality of independent member computers that includes said first plurality of independent member computers, said second plurality of independent member computers, and said third plurality of independent member computers.

11. The system according to claim 10, wherein said first profile includes a plurality of identification information for said first user wherein said plurality of identification information is received from a third user terminal associated with a third user and is stored in said database of independent member computers.

12. The system according to claim 10, wherein said purchase authorization to acquire said product is received from a fourth user terminal associated with a fourth user, wherein said fourth user is authorized to authorize said first user to acquire said product.

13. The system according to claim 10, wherein said order includes a plurality of terms and conditions from said first user to acquire said product including a price, a location, a distribution method and an authorization requirement.

14. The system according to claim 10, wherein said payment authorization includes a plurality of payment options including an escrow service, a cash payment, a credit card, a debit card, an online payment service, an electronic funds transfer, a digital cash equivalent, a check and a barter solution.

15. The system according to claim 10, wherein said plurality of conditions are at least one of an initial date and time when said second user can access said first user's order information, a duration of time that said second user can access said first user's order information, a number of times that said second user can access said first user's order information, a location from which said second user can access said first user's order information, a device on which said second user can access said first user's order information, a plurality of credentials of said second user and a biometric signature of said second user.

16. The system according to claim 10, wherein said bid includes a plurality of terms and conditions to supply said product.

17. The system according to claim 10, wherein said confirmation of delivery includes confirmation of a delivery of said product to said first user and a plurality of feedback about said second user from said first user.

18. The system according to claim 10, wherein a storer user can apply a first biometric signature to initiate an encryption process that submits said authorization message into a distributed encrypted database of independent member computers and a retriever user can apply a second biometric signature to initiate a recovery of said authorization message from said distributed encrypted database of independent member computers, wherein optionally said retriever user is said storer user.

19. A non-transitory computer storage medium storing computer executable instructions that, when executed, cause a processor to perform computer-implemented operations to enable a user to acquire an authorized product using a secure communication protocol, said operations comprising:
receiving, from a first user terminal associated with a first user, a first profile that includes a first plurality of authentication and authorization information;
receiving, from a second user terminal associated with a second user, a second profile that includes a second plurality of authentication and authorization information;
receiving, from the first user terminal associated with the first user, a purchase authorization to acquire a product, an order for the product and a payment authorization for the order;
receiving, from said first user terminal associated with said first user, a plurality of conditions for said second user to access the purchase authorization, the order and the payment authorization and displaying, on said second user terminal, said plurality of conditions for review by said second user;
receiving, from said second user terminal associated with said second user, a bid for said order to supply said product, based on said purchase authorization;
receiving, from said first user terminal associated with said first user, an acceptance of the bid for said order and an authorization to transfer a payment, based on said payment authorization, to said second user;
receiving, from said first user terminal associated with said first user, a confirmation of delivery of said product to said first user;
securing an authorization message, including said purchase authorization, said payment authorization and a user authorization, in a database of independent member computers, based on decomposing an encrypted version of said authorization message into a block of linked subcomponents that are distributed randomly across a first plurality of independent member computers, wherein:
said block of linked subcomponents is copied randomly to a second plurality of independent member computers to form a plurality of copies of said block of linked subcomponents;
periodically an oldest block of linked subcomponents is copied randomly to a third plurality of independent member computers to create a newest block of linked subcomponents; and
said oldest block of linked subcomponents is deleted after said creation of said newest block of linked subcomponents; and
recombining said encrypted version of said authorization message from its linked but randomly and dynamically distributed subcomponents then recovering said authorization message by decrypting said encrypted version of said authorization message,
whereby said encrypted version of said authorization message moves dynamically and randomly among a plurality of independent member computers that includes said first plurality of independent member computers, said second plurality of independent member computers, and said third plurality of independent member computers.

20. The non-transitory computer storage medium of claim 19, wherein a storer user can apply a first biometric signature to initiate an encryption process that submits said authorization message into a distributed encrypted database of independent member computers and a retriever user can apply a second biometric signature to initiate a recovery of said authorization message from said distributed encrypted database of independent member computers, wherein optionally said retriever user is said storer user.

* * * * *